United States Patent
Wang et al.

(10) Patent No.: US 10,051,485 B2
(45) Date of Patent: Aug. 14, 2018

(54) BEAM PRECODING MANNER REPORTING METHOD, SCHEDULING METHOD, AND DEVICE

(71) Applicant: Huawei Device Co., Ltd., Shenzhen (CN)

(72) Inventors: Jian Wang, Beijing (CN); Jianguo Wang, Bonn (DE)

(73) Assignee: Huawei Device Co., Ltd., Shenzhen (CN)

( * ) Notice: Subject to any disclaimer, the term of this patent is extended or adjusted under 35 U.S.C. 154(b) by 21 days.

(21) Appl. No.: 15/100,172

(22) PCT Filed: Nov. 29, 2013

(86) PCT No.: PCT/CN2013/088166
§ 371 (c)(1),
(2) Date: May 27, 2016

(87) PCT Pub. No.: WO2015/077985
PCT Pub. Date: Jun. 4, 2015

(65) Prior Publication Data
US 2016/0381569 A1 Dec. 29, 2016

(51) Int. Cl.
*H04B 7/00* (2006.01)
*H04W 16/28* (2009.01)
(Continued)

(52) U.S. Cl.
CPC ......... *H04W 16/28* (2013.01); *H04W 72/046* (2013.01); *H04W 72/082* (2013.01); *H04W 88/02* (2013.01)

(58) Field of Classification Search
CPC . H04W 72/046; H04W 72/082; H04W 88/02; H04W 16/28; H04B 7/088; H04B 17/318
See application file for complete search history.

(56) References Cited

U.S. PATENT DOCUMENTS 9,252,853 B2 * 2/2016 Sajadieh ............... H04L 5/0085
2004/0213187 A1 10/2004 Fujii
(Continued)

FOREIGN PATENT DOCUMENTS

CN 101019329 A 8/2007
CN 102098089 A 6/2011
(Continued)

OTHER PUBLICATIONS

"Codebook aspects for DL SU-MIMO Schemes for cross-polarised Antennas," 3GPP TSG RAN WG1 #49bis, Orlando, USA, R1-072658, 3rd Generation Partnership Project, Valbonne, France (Jun. 25-29, 2007).

*Primary Examiner* — Andrew W Chriss
*Assistant Examiner* — Lalita W Pace
(74) *Attorney, Agent, or Firm* — Leydig, Voit & Mayer, Ltd.

(57) ABSTRACT

Embodiments of the present invention provide a beam precoding manner reporting method, a scheduling method, and a device. The reporting method includes: determining, by UE, a used beam precoding manner, where the beam precoding manner is used to indicate a first beam combination usage result, and the first beam combination usage result includes usage manners, which are determined by the UE when the UE uses beams in combination, of the beams, where a beam combination usage manner includes one or two or three of beam selection, beam multiplexing, and beam cooperation according to different total quantities of the beams; and sending, by the UE, the beam precoding manner to a base station, so that the base station schedules the UE based on the beam precoding manner. Technical solutions of the present invention can reduce inter-cell interference in an active antenna system during vertical cell splitting, and increase a system throughput.

18 Claims, 4 Drawing Sheets

---

UE determines a beam precoding manner used by the UE, where the beam precoding manner is used to indicate a first beam combination usage result, and the first beam combination usage result includes usage manners, which are determined by the UE when the UE uses beams in combination, of the beams, where if a total quantity of the beams is 2, a beam combination usage manner includes one of beam selection, beam multiplexing, and beam cooperation; if the total quantity of the beams is 3, the beam combination usage manner includes one or two of the beam selection, the beam multiplexing, and the beam cooperation; and if the total quantity of the beams is greater than or equal to 4, the beam combination usage manner includes at least one of the beam selection, the beam multiplexing, and the beam cooperation — 101

The UE sends the beam precoding manner to a base station, so that the base station schedules the UE based on the beam precoding manner — 102

(51) Int. Cl.
*H04W 72/04* (2009.01)
*H04W 72/08* (2009.01)
*H04W 88/02* (2009.01)

(56) References Cited

U.S. PATENT DOCUMENTS

| | | | |
|---|---|---|---|
| 2005/0037799 A1* | 2/2005 | Braun | H04W 16/28 |
| | | | 455/525 |
| 2005/0176468 A1 | 8/2005 | Iacono et al. | |
| 2005/0197162 A1 | 9/2005 | Fujishima et al. | |
| 2006/0264184 A1* | 11/2006 | Li | H01Q 3/24 |
| | | | 455/101 |
| 2009/0291702 A1 | 11/2009 | Imai et al. | |
| 2010/0127931 A1 | 5/2010 | Rensburg et al. | |
| 2012/0076236 A1* | 3/2012 | Ko | H04B 7/0486 |
| | | | 375/296 |
| 2013/0039345 A1* | 2/2013 | Kim | H04W 72/046 |
| | | | 370/332 |
| 2013/0343303 A1* | 12/2013 | Kim | H04B 7/0452 |
| | | | 370/329 |

FOREIGN PATENT DOCUMENTS

| | | |
|---|---|---|
| CN | 102724682 A | 10/2012 |
| JP | 2005012357 A | 1/2005 |
| JP | 2005252521 A | 9/2005 |
| WO | 2007111266 A1 | 10/2007 |

\* cited by examiner

BEAM PRECODING MANNER REPORTING METHOD, SCHEDULING METHOD, AND DEVICE

CROSS-REFERENCE TO RELATED APPLICATION(S)

This application is a U.S. National Phase of International Patent Application No. PCT/CN2013/088166, filed Nov. 29, 2013, which is hereby incorporated by reference in its entirety.

TECHNICAL FIELD

Embodiments of the present disclosure relate to communications technologies, and in particular, to a beam precoding manner reporting method, a scheduling method, and a device.

BACKGROUND

In mobile communication, a signal is sent from a base station to user equipment by using a physical antenna on a base station side. For deployment of a macro network, in order to improve a system capacity and increase coverage of a base station, generally, a directional antenna technology rather than an omnidirectional antenna technology is widely used for an antenna of the base station of the macro network in a wireless communications system. A diagram showing that a gain of a directional antenna changes as a horizontal direction or a vertical direction changes is referred to as a gain directivity diagram. Antennas of base stations can be classified into passive antennas and active antennas. A gain directivity diagram of an active antenna can change in real time, that is, a high-gain direction of an active antenna can be adjusted in real time to an area where there are a relatively large quantity of services, so as to increase a system throughput.

An important application solution of an active antenna system is cell splitting. The so-called cell splitting refers to splitting a cell in the active antenna system into two or more cells. Generally, cell splitting is implemented by replacing a relatively wide beam with multiple narrower beams. Splitting a cell in a horizontal direction is referred to as horizontal splitting, and splitting a cell in a vertical direction is referred to as vertical splitting. After cell splitting, one original cell is split into two or more cells, and the cells obtained after splitting use a same physical resource such as time, frequency, and a code word, which helps increase a system throughput. Because one beam in one original cell is split into multiple beams in multiple cells and the multiple beams multiplex a same physical resource, interference exists between the multiple beams, and a direct result of cell splitting is an increase in cell interference intensity. If a beam design used for cell splitting is not optimized, the system throughput is greatly reduced due to the interference problem.

SUMMARY

Embodiments of the present disclosure provide a beam precoding manner reporting method, a scheduling method, and a device, which are used to reduce inter-cell interference in an active antenna system in a cell splitting solution and increase a system throughput.

A first aspect provides a beam precoding manner reporting method, including:

determining, by user equipment (UE), a beam precoding manner used by the UE, where the beam precoding manner is used to indicate a first beam combination usage result, and the first beam combination usage result includes usage manners, which are determined by the UE when the UE uses beams in combination, of the beams, where if a total quantity of the beams is 2, a beam combination usage manner includes one of beam selection, beam multiplexing, and beam cooperation; if the total quantity of the beams is 3, the beam combination usage manner includes one or two of the beam selection, the beam multiplexing, and the beam cooperation; and if the total quantity of the beams is greater than or equal to 4, the beam combination usage manner includes at least one of the beam selection, the beam multiplexing, and the beam cooperation; and sending, by the UE, the beam precoding manner to a base station, so that the base station schedules the UE based on the beam precoding manner, where the beam selection refers to: it is required that at least one beam among the beams that is different from a serving beam cannot serve another UE on a time-frequency resource used by the serving beam;

the beam multiplexing refers to: it is required that at least one beam among the beams that is different from a serving beam serves another UE on a time-frequency resource used by the serving beam; and the beam cooperation refers to: it is required that at least two beams that use a same time-frequency resource among the beams are used as the serving beam, where the serving beam refers to a beam that serves the UE among the beams.

With reference to the first aspect, in a first possible implementation manner of the first aspect, the determining, by user equipment (UE), a beam precoding manner used by the UE includes:

determining, by the UE according to received-signal strengths of the beams, a beam whose received-signal strength is the greatest among the beams as a first serving beam, separately comparing differences between the received-signal strength of the first serving beam and received-signal strengths of the other beams with a preset first threshold and a preset second threshold, and determining usage manners of the other beams according to a comparison result, to obtain the first beam combination usage result; and indicating, by the UE, the first beam combination usage result by using the beam precoding manner, where the first threshold is greater than the second threshold.

With reference to the first possible implementation manner of the first aspect, in a second possible implementation manner of the first aspect, the separately comparing, by the UE, differences between the received-signal strength of the first serving beam and received-signal strengths of the other beams with a preset first threshold and a preset second threshold, and determining usage manners of the other beams according to a comparison result includes:

separately comparing, by the UE, a first difference with the first threshold and the second threshold, where the first difference is a difference between the received-signal strength of the first serving beam and a received-signal strength of a second beam among the other beams;

if the first difference is greater than the first threshold, determining that the second beam can serve another UE on a time-frequency resource used by the first serving beam;

if the first difference is less than the second threshold, determining that the second beam serves the UE as a second serving beam; and if the first difference is greater than the second threshold and less than the first threshold, determining that the second beam cannot serve another UE on the time-frequency resource used by the first serving beam.

With reference to the first aspect or the first possible implementation manner of the first aspect or the second possible implementation manner of the first aspect, in a third possible implementation manner of the first aspect, if the beam combination usage manner includes the beam cooperation, the method further includes:

specifying, by the UE, a working phase of each serving beam according to received-signal phases of the at least two serving beams, and indicating the working phase of each serving beam by using the beam precoding manner.

With reference to the third possible implementation manner of the first aspect, in a fourth possible implementation manner of the first aspect, the specifying a working phase of each serving beam according to received-signal phases of the at least two serving beams, and indicating the working phase of each serving beam by using the beam precoding manner includes:

determining, by the UE, a serving beam among the at least two serving beams as a reference serving beam, and obtaining a difference between a received-signal phase of the reference serving beam and a received-signal phase of another serving beam; and indicating, by the UE, the received-signal phase of the reference serving beam and the difference between the received-signal phase of the reference serving beam and the received-signal phase of the another serving beam by using the beam precoding manner.

With reference to the first aspect or the first possible implementation manner of the first aspect or the second possible implementation manner of the first aspect or the third possible implementation manner of the first aspect or the fourth possible implementation manner of the first aspect, in a fifth possible implementation manner of the first aspect, the sending, by the UE, the beam precoding manner to a base station includes:

performing, by the UE, matching in a preset beam precoding table according to the beam precoding manner, to acquire an index value corresponding to the beam precoding manner, where a correspondence between various beam combination usage results and index values is stored in the beam precoding table; and sending, by the UE, the index value corresponding to the beam precoding manner to the base station.

With reference to the first aspect or the first possible implementation manner of the first aspect or the second possible implementation manner of the first aspect or the third possible implementation manner of the first aspect or the fourth possible implementation manner of the first aspect or the fifth possible implementation manner of the first aspect, in a sixth possible implementation manner of the first aspect, the sending, by the UE, the beam precoding manner to a base station includes:

sending, by the UE, the beam precoding manner to the base station after a rank indication RI subframe; or sending, by the UE, the beam precoding manner to the base station before an RI subframe.

A second aspect provides a scheduling method, including:

acquiring, by a base station, a beam precoding manner used by user equipment (UE), where the beam precoding manner is used to indicate a first beam combination usage result, and the first beam combination usage result includes usage manners, which are determined by the UE when the UE uses beams in combination, of the beams, where if a total quantity of the beams is 2, a beam combination usage manner includes one of beam selection, beam multiplexing, and beam cooperation; if the total quantity of the beams is 3, the beam combination usage manner includes one or two of the beam selection, the beam multiplexing, and the beam cooperation; and if the total quantity of the beams is greater than or equal to 4, the beam combination usage manner includes at least one of the beam selection, the beam multiplexing, and the beam cooperation; and scheduling, by the base station, the UE according to the beam precoding manner, where the beam selection refers to: it is required that at least one beam among the beams that is different from a serving beam cannot serve another UE on a time-frequency resource used by the serving beam;

the beam multiplexing refers to: it is required that at least one beam among the beams that is different from a serving beam serves another UE on a time-frequency resource used by the serving beam; and the beam cooperation refers to: it is required that at least two beams that use a same time-frequency resource among the beams are used as the serving beam, where the serving beam refers to a beam that serves the UE among the beams.

With reference to the second aspect, in a first possible implementation manner of the second aspect, the acquiring, by a base station, a beam precoding manner used by user equipment (UE) includes:

receiving, by the base station, an index value that corresponds to the beam precoding manner and that is sent by the UE; and performing, by the base station, matching in a preset beam precoding table according to the index value corresponding to the beam precoding manner, and determining a beam combination usage result that matches the index value corresponding to the beam precoding manner, where a correspondence between various beam combination usage results and index values is stored in the beam precoding table.

With reference to the second aspect or the first possible implementation manner of the second aspect, in a second possible implementation manner of the second aspect, the scheduling, by the base station, the UE according to the beam precoding manner includes:

determining, by the base station, a serving beam of the UE among the beams and a usage manner of another beam according to the first beam combination usage result indicated by the beam precoding manner; and allocating, by the base station, a time-frequency resource to the serving beam, transmitting data to the UE on the time-frequency resource by using the serving beam, and transmitting data according to the usage manner of the another beam by using the another beam.

With reference to the second possible implementation manner of the second aspect, in a third possible implementation manner of the second aspect, the transmitting, by the base station, data according to the usage manner of the another beam by using the another beam includes:

if the usage manner of the another beam is: the another beam cannot be used to transmit data to another UE on the time-frequency resource used by the serving beam, forbidding, by the base station, use of the another beam to transmit data to another UE on the time-frequency resource used by the serving beam; and if the usage manner of the another beam is: the another beam needs to be used to transmit data to another UE on the time-frequency resource used by the serving beam, transmitting, by the base station by using the another beam, data to another UE on the time-frequency resource used by the serving beam.

With reference to the second possible implementation manner of the second aspect or the third possible implementation manner of the second aspect, in a fourth possible implementation manner of the second aspect, if the beam combination usage manner includes the beam cooperation, before the transmitting, by the base station, data to the UE on the time-frequency resource by using the serving beam, the method further includes:

determining, by the base station, a working phase of each serving beam according to the beam precoding manner, and if the serving beam does not work at the determined phase, adjusting, by the base station, a phase of the serving beam, so that the serving beam works at the determined phase.

With reference to the fourth possible implementation manner of the second aspect, in a fifth possible implementation manner of the second aspect, the determining, by the base station, a working phase of each serving beam according to the beam precoding manner includes:

determining, by the base station, a received-signal phase of a reference serving beam and a difference between the received-signal phase of the reference serving beam and a received-signal phase of another serving beam according to the beam precoding manner; and using, by the base station, the received-signal phase of the reference serving beam as a working phase of the reference serving beam, and adding the received-signal phase of the reference serving beam to the difference between the received-signal phase of the reference serving beam and the received-signal phase of the another serving beam, to obtain a working phase of the another serving beam.

A third aspect provides user equipment (UE), including:

a determining module, configured to determine a beam precoding manner used by the UE, where the beam precoding manner is used to indicate a first beam combination usage result, and the first beam combination usage result includes usage manners, which are determined by the UE when the UE uses beams in combination, of the beams, where if a total quantity of the beams is 2, a beam combination usage manner includes one of beam selection, beam multiplexing, and beam cooperation; if the total quantity of the beams is 3, the beam combination usage manner includes one or two of the beam selection, the beam multiplexing, and the beam cooperation; and if the total quantity of the beams is greater than or equal to 4, the beam combination usage manner includes at least one of the beam selection, the beam multiplexing, and the beam cooperation; and a sending module, configured to send the beam precoding manner to a base station, so that the base station schedules the UE based on the beam precoding manner, where the beam selection refers to: it is required that at least one beam among the beams that is different from a serving beam cannot serve another UE on a time-frequency resource used by the serving beam;

the beam multiplexing refers to: it is required that at least one beam among the beams that is different from a serving beam serves another UE on a time-frequency resource used by the serving beam; and the beam cooperation refers to: it is required that at least two beams that use a same time-frequency resource among the beams are used as the serving beam, where the serving beam refers to a beam that serves the UE among the beams.

With reference to the third aspect, in a first possible implementation manner of the third aspect, the determining a beam precoding manner used by the UE specifically includes:

determining, according to received-signal strengths of the beams, a beam whose received-signal strength is the greatest among the beams as a first serving beam, separately comparing differences between the received-signal strength of the first serving beam and received-signal strengths of the other beams with a preset first threshold and a preset second threshold, and determining usage manners of the other beams according to a comparison result, to obtain the first beam combination usage result; and indicating the first beam combination usage result by using the beam precoding manner, where the first threshold is greater than the second threshold.

With reference to the first possible implementation manner of the third aspect, in a second possible implementation manner of the third aspect, the separately comparing differences between the received-signal strength of the first serving beam and received-signal strengths of the other beams with a preset first threshold and a preset second threshold, and determining usage manners of the other beams according to a comparison result specifically includes:

separately comparing a first difference with the first threshold and the second threshold, where the first difference is a difference between the received-signal strength of the first serving beam and a received-signal strength of a second beam among the other beams; if the first difference is greater than the first threshold, determining that the second beam can serve another UE on a time-frequency resource used by the first serving beam; if the first difference is less than the second threshold, determining that the second beam serves the UE as a second serving beam; and if the first difference is greater than the second threshold and less than the first threshold, determining that the second beam cannot serve another UE on the time-frequency resource used by the first serving beam.

With reference to the third aspect or the first possible implementation manner of the third aspect or the second possible implementation manner of the third aspect, in a third possible implementation manner of the third aspect, the UE further includes:

a phase specifying module, configured to: when the beam combination usage manner includes the beam cooperation, specify a working phase of each serving beam according to received-signal phases of the at least two serving beams, and indicate the working phase of each serving beam by using the beam precoding manner.

With reference to the third possible implementation manner of the third aspect, in a fourth possible implementation manner of the third aspect, the specifying a working phase of each serving beam according to received-signal phases of the at least two serving beams, and indicating the working phase of each serving beam by using the beam precoding manner specifically includes:

determining a serving beam among the at least two serving beams as a reference serving beam, and obtaining a difference between a received-signal phase of the reference serving beam and a received-signal phase of another serving beam; and indicating the received-signal phase of the reference serving beam and the difference between the received-signal phase of the reference serving beam and the received-signal phase of the another serving beam by using the beam precoding manner.

With reference to the third aspect or the first possible implementation manner of the third aspect or the second possible implementation manner of the third aspect or the third possible implementation manner of the third aspect or the fourth possible implementation manner of the third aspect, in a fifth possible implementation manner of the third aspect, the sending the beam precoding manner to a base station specifically includes:

performing matching in a preset beam precoding table according to the beam precoding manner, to acquire an index value corresponding to the beam precoding manner; and sending the index value corresponding to the beam precoding manner to the base station, where a correspondence between various beam combination usage results and index values is stored in the beam precoding table.

With reference to the third aspect or the first possible implementation manner of the third aspect or the second possible implementation manner of the third aspect or the third possible implementation manner of the third aspect or the fourth possible implementation manner of the third aspect or the fifth possible implementation manner of the third aspect, in a sixth possible implementation manner of the third aspect, the sending the beam precoding manner to a base station specifically includes:

sending the beam precoding manner to the base station after a rank indication RI subframe; or sending the beam precoding manner to the base station before an RI subframe.

A fourth aspect provides a base station, including:

an acquisition module, configured to acquire a beam precoding manner used by user equipment (UE), where the beam precoding manner is used to indicate a first beam combination usage result, and the first beam combination usage result includes usage manners, which are determined by the UE when the UE uses beams in combination, of the beams, where if a total quantity of the beams is 2, a beam combination usage manner includes one of beam selection, beam multiplexing, and beam cooperation; if the total quantity of the beams is 3, the beam combination usage manner includes one or two of the beam selection, the beam multiplexing, and the beam cooperation; and if the total quantity of the beams is greater than or equal to 4, the beam combination usage manner includes at least one of the beam selection, the beam multiplexing, and the beam cooperation; and a scheduling module, configured to schedule the UE according to the beam precoding manner, where the beam selection refers to: it is required that at least one beam among the beams that is different from a serving beam cannot serve another UE on a time-frequency resource used by the serving beam;

the beam multiplexing refers to: it is required that at least one beam among the beams that is different from a serving beam serves another UE on a time-frequency resource used by the serving beam; and the beam cooperation refers to: it is required that at least two beams that use a same time-frequency resource among the beams are used as the serving beam, where the serving beam refers to a beam that serves the UE among the beams.

With reference to the fourth aspect, in a first possible implementation manner of the fourth aspect, the acquiring a beam precoding manner used by user equipment (UE) specifically includes:

receiving an index value that corresponds to the beam precoding manner and that is sent by the UE; and performing matching in a preset beam precoding table according to the index value corresponding to the beam precoding manner, and determining a beam combination usage result that matches the index value corresponding to the beam precoding manner, where a correspondence between various beam combination usage results and index values is stored in the beam precoding table.

With reference to the fourth aspect or the first possible implementation manner of the fourth aspect, in a second possible implementation manner of the fourth aspect, the scheduling the UE according to the beam precoding manner specifically includes:

determining a serving beam of the UE among the beams and a usage manner of another beam according to the first beam combination usage result indicated by the beam precoding manner; and allocating a time-frequency resource to the serving beam, transmitting data to the UE on the time-frequency resource by using the serving beam, and transmitting data according to the usage manner of the another beam by using the another beam.

With reference to the second possible implementation manner of the fourth aspect, in a third possible implementation manner of the fourth aspect, the transmitting data according to the usage manner of the another beam by using the another beam specifically includes:

when the usage manner of the another beam is: the another beam cannot be used to transmit data to another UE on the time-frequency resource used by the serving beam, forbidding use of the another beam to transmit data to another UE on the time-frequency resource used by the serving beam; and when the usage manner of the another beam is: the another beam needs to be used to transmit data to another UE on the time-frequency resource used by the serving beam, transmitting, by using the another beam, data to another UE on the time-frequency resource used by the serving beam.

With reference to the second possible implementation manner of the fourth aspect or the third possible implementation manner of the fourth aspect, in a fourth possible implementation manner of the fourth aspect, the scheduling module is further configured to: when the beam combination usage manner includes the beam cooperation, before transmitting data to the UE on the time-frequency resource by using the serving beam, determine a working phase of each serving beam according to the beam precoding manner, and if the serving beam does not work at the determined phase, adjust a phase of the serving beam, so that the serving beam works at the determined phase.

With reference to the fourth possible implementation manner of the fourth aspect, in a fifth possible implementation manner of the fourth aspect, the determining a working phase of each serving beam according to the beam precoding manner specifically includes:

determining a received-signal phase of a reference serving beam and a difference between the received-signal phase of the reference serving beam and a received-signal phase of another serving beam according to the beam precoding manner; and using the received-signal phase of the reference serving beam as a working phase of the reference serving beam, and adding the received-signal phase of the reference serving beam to the difference between the received-signal phase of the reference serving beam and the received-signal phase of the another serving beam, to obtain a working phase of the another serving beam.

A fifth aspect provides user equipment (UE), including:

a processor, configured to determine a beam precoding manner used by the UE, where the beam precoding manner is used to indicate a first beam combination usage result, and the first beam combination usage result includes usage manners, which are determined by the UE when the UE uses beams in combination, of the beams, where if a total quantity of the beams is 2, a beam combination usage manner includes one of beam selection, beam multiplexing, and beam cooperation; if the total quantity of the beams is 3, the beam combination usage manner includes one or two of the beam selection, the beam multiplexing, and the beam cooperation; and if the total quantity of the beams is greater than or equal to 4, the beam combination usage manner includes at least one of the beam selection, the beam multiplexing, and the beam cooperation; and a transmitter, configured to send the beam precoding manner to a base station, so that the base station schedules the UE based on the beam precoding manner, where the beam selection refers to: it is required that at least one beam among the beams that is different from a serving beam cannot serve another UE on a time-frequency resource used by the serving beam;

the beam multiplexing refers to: it is required that at least one beam among the beams that is different from a serving beam serves another UE on a time-frequency resource used by the serving beam; and the beam cooperation refers to: it is required that at least two beams that use a same time-frequency resource among the beams are used as the serving beam, where the serving beam refers to a beam that serves the UE among the beams.

With reference to the fifth aspect, in a first possible implementation manner of the fifth aspect, the UE further includes:

a power measurement circuit, configured to measure received-signal strengths of the beams; and the determining a beam precoding manner used by the UE specifically includes: determining, according to the received-signal strengths of the beams, a beam whose received-signal strength is the greatest among the beams as a first serving beam, separately comparing differences between the received-signal strength of the first serving beam and received-signal strengths of the other beams with a preset first threshold and a preset second threshold, and determining usage manners of the other beams according to a comparison result, to obtain the first beam combination usage result; and indicating the first beam combination usage result by using the beam precoding manner, where the first threshold is greater than the second threshold.

With reference to the first possible implementation manner of the fifth aspect, in a second possible implementation manner of the fifth aspect, the separately comparing differences between the received-signal strength of the first serving beam and received-signal strengths of the other beams with a preset first threshold and a preset second threshold, and determining usage manners of the other beams according to a comparison result specifically includes:

separately comparing a first difference with the first threshold and the second threshold, where the first difference is a difference between the received-signal strength of the first serving beam and a received-signal strength of a second beam among the other beams; if the first difference is greater than the first threshold, determining that the second beam can serve another UE on a time-frequency resource used by the first serving beam; if the first difference is less than the second threshold, determining that the second beam serves the UE as a second serving beam; and if the first difference is greater than the second threshold and less than the first threshold, determining that the second beam cannot serve another UE on the time-frequency resource used by the first serving beam.

With reference to the fifth aspect or the first possible implementation manner of the fifth aspect or the second possible implementation manner of the fifth aspect, in a third possible implementation manner of the fifth aspect, the processor is further configured to: when the beam combination usage manner includes the beam cooperation, specify a working phase of each serving beam according to received-signal phases of the at least two serving beams, and indicate the working phase of each serving beam by using the beam precoding manner.

With reference to the third possible implementation manner of the fifth aspect, in a fourth possible implementation manner of the fifth aspect, the specifying a working phase of each serving beam according to received-signal phases of the at least two serving beams, and indicating the working phase of each serving beam by using the beam precoding manner specifically includes:

determining a serving beam among the at least two serving beams as a reference serving beam, and obtaining a difference between a received-signal phase of the reference serving beam and a received-signal phase of another serving beam; and indicating the received-signal phase of the reference serving beam and the difference between the received-signal phase of the reference serving beam and the received-signal phase of the another serving beam by using the beam precoding manner.

With reference to the fifth aspect or the first possible implementation manner of the fifth aspect or the second possible implementation manner of the fifth aspect or the third possible implementation manner of the fifth aspect or the fourth possible implementation manner of the fifth aspect, in a fifth possible implementation manner of the fifth aspect, the processor is further configured to perform matching in a preset beam precoding table according to the beam precoding manner, to acquire an index value corresponding to the beam precoding manner; and the sending the beam precoding manner to a base station specifically includes:

sending the index value corresponding to the beam precoding manner to the base station, where a correspondence between various beam combination usage results and index values is stored in the beam precoding table.

With reference to the fifth aspect or the first possible implementation manner of the fifth aspect or the second possible implementation manner of the fifth aspect or the third possible implementation manner of the fifth aspect or the fourth possible implementation manner of the fifth aspect or the fifth possible implementation manner of the fifth aspect, in a sixth possible implementation manner of the fifth aspect, the sending the beam precoding manner to a base station specifically includes:

sending the beam precoding manner to the base station after a rank indication RI subframe; or sending the beam precoding manner to the base station before an RI subframe.

A sixth aspect provides a base station, including:

a processor, configured to acquire a beam precoding manner used by user equipment (UE), and schedule the UE according to the beam precoding manner, where the beam precoding manner is used to indicate a first beam combination usage result, and the first beam combination usage result includes usage manners, which are determined by the UE when the UE uses beams in combination, of the beams, where if a total quantity of the beams is 2, a beam combination usage manner includes one of beam selection, beam multiplexing, and beam cooperation; if the total quantity of the beams is 3, the beam combination usage manner includes one or two of the beam selection, the beam multiplexing, and the beam cooperation; and if the total quantity of the beams is greater than or equal to 4, the beam combination usage manner includes at least one of the beam selection, the beam multiplexing, and the beam cooperation; and the beam selection refers to: it is required that at least one beam among the beams that is different from a serving beam cannot serve another UE on a time-frequency resource used by the serving beam;

the beam multiplexing refers to: it is required that at least one beam among the beams that is different from a serving beam serves another UE on a time-frequency resource used by the serving beam; and the beam cooperation refers to: it is required that at least two beams that use a same time-frequency resource among the beams are used as the serving beam, where the serving beam refers to a beam that serves the UE among the beams.

With reference to the sixth aspect, in a first possible implementation manner of the sixth aspect, the base station further includes:

a receiver, configured to receive an index value that corresponds to the beam precoding manner and that is sent by the UE; and the acquiring a beam precoding manner used by user equipment (UE) specifically includes:

performing matching in a preset beam precoding table according to the index value that corresponds to the beam precoding manner and that is received by the receiver, and determining a beam combination usage result that matches the index value corresponding to the beam precoding manner, where a correspondence between various beam combination usage results and index values is stored in the beam precoding table.

With reference to the sixth aspect or the first possible implementation manner of the sixth aspect, in a second possible implementation manner of the sixth aspect, the base station further includes: a transmitter;

the scheduling the UE according to the beam precoding manner specifically includes:

determining a serving beam of the UE among the beams and a usage manner of another beam according to the first beam combination usage result indicated by the beam precoding manner; and allocating a time-frequency resource to the serving beam, controlling the transmitter to transmit, by using the serving beam, data to the UE on the time-frequency resource, and controlling the transmitter to transmit, by using the another beam, data according to the usage manner of the another beam; and the transmitter is configured to transmit, under the control of the processor, data to the UE on the time-frequency resource by using the serving beam, and transmit data according to the usage manner of the another beam by using the another beam.

With reference to the second possible implementation manner of the sixth aspect, in a third possible implementation manner of the sixth aspect, the controlling the transmitter to transmit, by using the another beam, data according to the usage manner of the another beam specifically includes:

when the usage manner of the another beam is: the another beam cannot be used to transmit data to another UE on the time-frequency resource used by the serving beam, forbidding the transmitter to transmit, by using the another beam, data to another UE on the time-frequency resource used by the serving beam; and when the usage manner of the another beam is: the another beam needs to be used to transmit data to another UE on the time-frequency resource used by the serving beam, controlling the transmitter to transmit, by using the another beam, data to another UE on the time-frequency resource used by the serving beam.

With reference to the second possible implementation manner of the sixth aspect or the third possible implementation manner of the sixth aspect, in a fourth possible implementation manner of the sixth aspect, the processor is further configured to: when the beam combination usage manner includes the beam cooperation, before controlling the transmitter to transmit, by using the serving beam, data to the UE on the time-frequency resource, determine a working phase of each serving beam according to the beam precoding manner, and if the serving beam does not work at the determined phase, adjust a phase of the serving beam, so that the serving beam works at the determined phase.

With reference to the fourth possible implementation manner of the sixth aspect, in a fifth possible implementation manner of the sixth aspect, the determining a working phase of each serving beam according to the beam precoding manner specifically includes:

determining a received-signal phase of a reference serving beam and a difference between the received-signal phase of the reference serving beam and a received-signal phase of another serving beam according to the beam precoding manner; and using the received-signal phase of the reference serving beam as a working phase of the reference serving beam, and adding the received-signal phase of the reference serving beam to the difference between the received-signal phase of the reference serving beam and the received-signal phase of the another serving beam, to obtain a working phase of the another serving beam.

According to the beam precoding manner reporting method, the scheduling method, and the device that are provided by the embodiments of the present disclosure, when using beams in combination, user equipment determines usage manners of the beams, to form a first beam combination usage result, and indicates the first beam combination usage result by using a beam precoding manner, and then sends the beam precoding manner to a base station, so that the base station schedules the user equipment based on the beam precoding manner. In the embodiments of the present disclosure, a beam combination usage manner used in a process of determining the beam precoding manner is not limited to beam multiplexing, but includes beam selection, beam multiplexing, and beam cooperation. Therefore, the UE can select different beam combination usage manners according to inter-beam interference. For example, when inter-beam interference is relatively small, the method of beam multiplexing may be used, which helps increase a system throughput; when inter-beam interference is relatively great, another method such as the beam selection or the beam cooperation may be used, to avoid inter-beam interference and improve strength of a wanted signal, thereby increasing a system throughput.

BRIEF DESCRIPTION OF DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
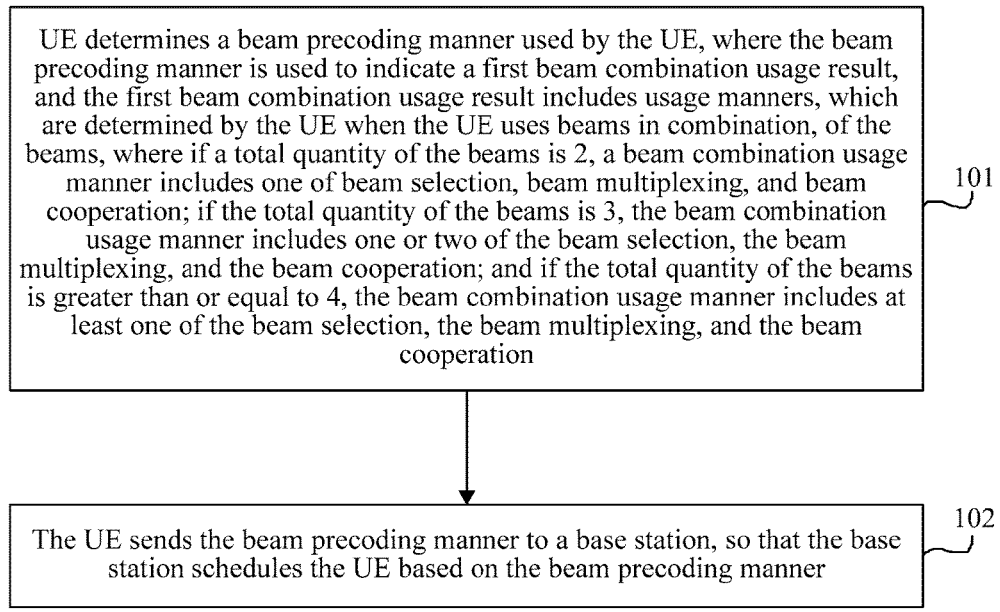
FIG. 1 is a flowchart of a beam precoding manner reporting method according to an embodiment of the present disclosure.

FIG. 1 is a flowchart of a beam precoding manner reporting method according to an embodiment of the present disclosure. As shown in FIG. 1, the method includes:

101: User equipment (UE) determines a beam precoding manner used by the UE, where the beam precoding manner is used to indicate a first beam combination usage result, and the first beam combination usage result includes usage manners, which are determined by the UE when the UE uses beams in combination, of the beams, where if a total quantity of the beams is 2, a beam combination usage manner includes one of beam selection, beam multiplexing, and beam cooperation; if the total quantity of the beams is 3, the beam combination usage manner includes one or two of the beam selection, the beam multiplexing, and the beam cooperation; and if the total quantity of the beams is greater than or equal to 4, the beam combination usage manner includes at least one of the beam selection, the beam multiplexing, and the beam cooperation.

The "beams" herein may include all beams transmitted by a base station, or may include only beams that are actually used. For example, the base station transmits 10 beams in total, but only five beams are actually used, and the other five beams remain unused all the time; in this case, the "beams" may include only the five beams that are actually used.

102: The UE sends the beam precoding manner to a base station, so that the base station schedules the UE based on the beam precoding manner.

In an active antenna system (AAS), an active antenna array can generate beams that are in different directions in space, to implement cell splitting. Therefore, for the AAS, cell splitting may be performed in a vertical direction. Cells obtained after vertical splitting may multiplex a same time-frequency resource, to improve a system capacity. However, beams overlap in a transition area of the beams, and because a difference between gains of the beams in the transition area is not great, inter-beam interference is relatively great. This leads to a relatively low signal-to-noise ratio of UE, which further reduces a system throughput and affects a gain of vertical cell splitting.

To resolve this problem, this embodiment provides a beam precoding manner reporting method, which includes: determining, by UE, a used beam precoding manner, and then reporting the beam precoding manner to a base station; and scheduling, by the base station, the UE according to the beam precoding manner. In this embodiment, the scheduling, by the UE, the UE according to the beam precoding manner mainly refers to a process of determining a serving beam of the UE based on the beam precoding manner, allocating a time-frequency resource to the serving beam of the UE, and transmitting data to the UE on the allocated time-frequency resource by using the serving beam. Optionally, the UE may determine the used beam precoding manner according to inter-beam interference. In this embodiment, the beam precoding manner used by the UE is used to indicate a first beam combination usage result, and the first beam combination usage result includes usage manners, which are determined by the UE when the UE uses beams in combination, of the beams. Unlike the prior art in which a beam combination usage manner includes only beam multiplexing, in this embodiment, a beam combination usage manner includes beam selection, beam multiplexing, and beam cooperation, and therefore, the usage manners of the beams included in the first beam combination usage result are no longer limited to one manner, that is, multiplexing. In this embodiment, because there are many beam combination usage manners, the UE can flexibly select a beam combination usage manner according to inter-beam interference. For example, when inter-beam interference is relatively small, the beam multiplexing manner may be selected, to increase a system throughput; when inter-beam interference is relatively great, another manner such as the beam selection or the beam cooperation may be selected, to avoid inter-beam interference and improve strength of a wanted signal, thereby increasing a system throughput.

For example, the beam combination usage manner involved in this embodiment may be one of the beam selection, the beam multiplexing, and the beam cooperation. For another example, the beam combination usage manner involved in this embodiment may be a combination of any two of the beam selection, the beam multiplexing, and the beam cooperation. For another example, the beam combination usage manner involved in this embodiment may be a combination of the beam selection, the beam multiplexing, and the beam cooperation. The beam combination usage manner may be decided by a quantity of beams to some degree. For example, if the total quantity of the beams is 2, the beam combination usage manner may be one of the beam selection, the beam multiplexing, and the beam cooperation; if the total quantity of the beams is 3, the beam combination usage manner may be any one of or a combination of any two of the beam selection, the beam multiplexing, and the beam cooperation; and if the total quantity of the beams is greater than or equal to 4, the beam combination usage manner may be at least one of the beam selection, the beam multiplexing, and the beam cooperation.

It should be noted herein that in this embodiment of the present disclosure, the beam selection refers to: it is required that at least one beam among the beams that is different from a serving beam cannot serve another UE on a time-frequency resource used by the serving beam, where the serving beam refers to a beam that serves the UE. For example, it is assumed that there are three beams: beam 0, beam 1, and beam 2. For example, assuming that beam 0 among the three beams serves the UE as a serving beam, at least one beam of beam 1 and beam 2 cannot serve another UE on a time-frequency resource used by beam 0. For another example, assuming that beam 1 among the three beams serves the UE as a serving beam, at least one beam of beam 0 and beam 2 cannot serve another UE on a time-frequency resource used by beam 1. For another example, assuming that beam 2 among the three beams serves the UE as a serving beam, at least one beam of beam 0 and beam 1 cannot serve another UE on a time-frequency resource used by beam 2. For still another example, it is assumed that there are two beams: beam 0 and beam 1. For example, assuming that beam 0 of the two beams serves the UE as a serving beam, beam 1 cannot serve another UE on a time-frequency resource used by beam 0. For another example, assuming that beam 1 of the two beams serves the UE as a serving beam, beam 0 cannot serve another UE on a time-frequency resource used by beam 1.

In this embodiment of the present disclosure, the beam multiplexing refers to: it is required that at least one beam among the beams that is different from a serving beam serves another UE on a time-frequency resource used by the serving beam. For example, it is assumed that there are three beams: beam 0, beam 1, and beam 2. For example, assuming that beam 0 among the three beams serves the UE as a serving beam, at least one beam of beam 1 and beam 2 needs to serve another UE on a time-frequency resource used by beam 0. For another example, assuming that beam 1 among the three beams serves the UE as a serving beam, at least one beam of beam 0 and beam 2 needs to serve another UE on a time-frequency resource used by beam 1. For another example, assuming that beam 2 among the three beams serves the UE as a serving beam, at least one beam of beam 0 and beam 1 needs to serve another UE on a time-frequency resource used by beam 2. For still another example, it is assumed that there are two beams: beam 0 and beam 1. For example, assuming that beam 0 of the two beams serves the UE as a serving beam, beam 1 needs to serve another UE on a time-frequency resource used by beam 0. For another example, assuming that beam 1 of the two beams serves the UE as a serving beam, beam 0 needs to serve another UE on a time-frequency resource used by beam 1.

In this embodiment of the present disclosure, the beam cooperation refers to: it is required that at least two beams that use a same time-frequency resource among the beams are used as serving beams. For example, it is assumed that there are three beams: beam 0, beam 1, and beam 2. One beam cooperation manner may be selecting beam 0 and beam 1 as serving beams to serve the UE, that is, beam 0 and beam 1 use a same time-frequency resource to transmit signals for the UE. For another example, a beam cooperation manner may be selecting beam 1 and beam 2 as serving beams to serve the UE, that is, beam 1 and beam 2 use a same time-frequency resource to transmit signals for the UE. For still another example, it is assumed that there are two beams: beam 0 and beam 1. A beam selection manner may be selecting beam 0 and beam 1 as serving beams to serve the UE, that is, beam 0 and beam 1 use a same time-frequency resource to transmit signals for the UE.

Meanings of a manner of combining the beam selection and the beam multiplexing, a manner of combining the beam selection and the beam cooperation, a manner of combining the beam multiplexing and the beam cooperation, and a manner of combining the beam selection, the beam multiplexing, and the beam cooperation can be obtained by directly combining the foregoing meanings of the beam selection, the beam multiplexing, and the beam selection. For example, the manner of combining the beam selection and the beam multiplexing refers to: it is required that at least one beam among the beams that is different from a serving beam cannot serve another UE on a time-frequency resource used by the serving beam, and it is required that at least one beam among the beams that is different from the serving beam serves another UE on the time-frequency resource used by the serving beam. The manner of combining the beam selection and the beam cooperation refers to: it is required that at least two beams that use a same time-frequency resource among the beams are used as serving beams, and it is required that at least one beam among the beams that is different from the serving beams cannot serve another UE on the time-frequency resource used by the serving beams. The manner of combining the beam cooperation and the beam multiplexing refers to: it is required that at least two beams that use a same time-frequency resource among the beams are used as serving beams, and it is required that at least one beam among the beams that is different from the serving beams serves another UE on the time-frequency resource used by the serving beams. Other combination manners are not listed herein one by one.

In an optional implementation manner, inter-beam interference may be indicated by using value relationships between received-signal strengths of the beams. Therefore, an implementation manner of step 101, that is, UE determines a used beam precoding manner, includes: determining, by the UE according to received-signal strengths of the beams, a beam whose received-signal strength is the greatest as a first serving beam to serve the UE, then separately comparing differences between the received-signal strength of the first serving beam and received-signal strengths of the other beams with a preset first threshold and a preset second threshold, and determining usage manners of the other beams according to a comparison result, to obtain the first beam combination usage result; and indicating the first beam combination usage result by using the beam precoding manner.

Specifically, the UE first measures received-signal strengths of the beams in the AAS antenna system. The received-signal strengths herein may be indicated by receive power, for example, reference signal received power (RSRP), but the present disclosure is not limited thereto. Then the UE determines the beam combination usage manner and the usage manners of the beams according to relationships between the received-signal strengths of the beams. It is assumed that the UE presets two thresholds: a first threshold and a second threshold. The first threshold is greater than the second threshold, for example, a value of the first threshold may be 10 dB, and a value of the second threshold may be 3 dB, but the present disclosure is not limited thereto. After power measurement, the UE first selects a beam whose received-signal strength is the greatest as a first serving beam of the UE. Then the UE acquires a difference between a received-signal strength of the first serving beam and a received-signal strength of a second beam among the other beams, and records the difference as a first difference, where the second beam herein may be any beam among the other beams; and separately compares the obtained first difference with the first threshold and the second threshold. If the first difference is greater than the first threshold, that is, the received-signal strength of the second beam is at least 10 dB less than the received-signal strength of the first serving beam, the UE may consider that interference of the second beam on the first serving beam is relatively small, and determine that the second beam can serve another UE on a time-frequency resource used by the first serving beam; therefore, the UE may select the beam multiplexing manner. If the first difference is less than the second threshold, that is, the received-signal strength of the second beam is at most 3 dB less than the received-signal strength of the first serving beam, the UE considers that power values of the second beam and the first serving beam for the UE are almost equivalent, and determines that the second beam can serve the UE as a second serving beam; therefore, the UE may select the beam cooperation manner. If the first difference is greater than the second threshold and less than the first threshold, that is, receive power of the second beam is at least 3 dB and at most 10 dB less than receive power of the first serving beam, the UE considers that inference of the second beam on the first serving beam is relatively great but does not reach a threshold indicating that the second beam can serve the UE; in this case, the UE may select the beam selection manner, and determine that the second beam cannot serve the UE or another UE on a time-frequency resource used by the first serving beam.

Further description is provided by using an example in which the first threshold is 10 dB and the second threshold is 3 dB. A case of two beams is considered:

For example, it is assumed that receive power of beam 0 is −90 dBm and receive power of beam 1 is −110 dBm. In this case, the UE selects beam 0 whose receive power is the greatest as a serving beam of the UE. A difference between the receive power of beam 0 and the receive power of beam 1 is greater than the first threshold, that is, 10 dBm; therefore, the UE considers that interference of beam 1 on beam 0 is relatively small, and therefore determines that beam 1 can serve another UE on a time-frequency resource used by beam 0; in this case, a manner for using beam 0 and beam 1 in combination is the beam multiplexing. In this implementation manner, a usage manner of beam 0 is that beam 0 serves the UE as a serving beam of the UE, while a usage manner of beam 1 is that beam 1 serves another UE on the time-frequency resource used by beam 0.

It is assumed that receive power of beam 0 is −90 dBm and receive power of beam 1 is −91 dBm. In this case, the UE selects beam 0 whose receive power is the greatest as a serving beam of the UE. A difference between the receive power of beam 0 and the receive power of beam 1 is less than the second threshold, that is, 3 dB, which means that power values of beam 0 and beam 1 for the UE are almost equivalent and beam 1 can also be used as a serving beam of the UE; therefore, the UE also selects beam 1 as a serving beam; in this case, a manner for using beam 0 and beam 1 in combination is the beam cooperation. In this implementation manner, usage manners of beam 0 and beam 1 are that both beam 0 and beam 1 serve the UE as serving beams of the UE.

Optionally, in the beam combination manner, the UE adds up strengths of signals from the serving beams, to obtain a final received-signal strength. To obtain the greatest possible received-signal strength, it is preferred that a phase difference between the received signals on the serving beams is as small as possible, and an ideal case is that the received signals on the serving beams have a same phase. Based on this, when determining that the beam combination usage manner includes the beam combination, the UE may further specify a working phase of each serving beam according to received-signal phases of the at least two serving beams, and indicate the working phase of each serving beam by using the beam precoding manner, to obtain the greatest possible received-signal strength. In the foregoing example, the UE may further specify working phases of beam 0 and beam 1, and indicate the working phases of beam 0 and beam 1 by using the beam precoding manner, so as to report the working phases of the serving beams to the base station by using the beam precoding manner; in this way, the base station can enable the serving beams to work at the phases specified by the UE; in this way, the UE can obtain the greatest possible received-signal strength by using beam 0 and beam 1. Optionally, an implementation manner of the specifying, by the UE, a working phase of each serving beam according to received-signal phases of the at least two serving beams, and indicating the working phase of each serving beam by using the beam precoding manner includes: determining, by the UE, a serving beam among the serving beams as a reference serving beam, and obtaining a difference between a received-signal phase of the reference serving beam and a received-signal phase of another serving beam; and indicating the received-signal phase of the reference serving beam and the difference between the received-signal phase of the reference serving beam and the received-signal phase of the another serving beam by using the beam precoding manner. The base station may directly use the received-signal phase of the reference serving beam as a working phase of the reference serving beam, and obtain a working phase of the another serving beam according to the received-signal phase of the reference serving beam and the foregoing difference. The UE may not only measure the received-signal strengths of the beams but also measure received-signal phases of the beams. The measurement of the received-signal phases of the beams by the UE belongs to the prior art, and details are not described herein.

It is assumed that receive power of beam 0 is −90 dBm and receive power of beam 1 is −95 dBm. In this case, the UE selects beam 0 whose receive power is the greatest as a serving beam of the UE. A difference between the receive power of beam 0 and the receive power of beam 1 is greater than the second threshold and less than the first threshold, which means that inference of beam 1 on beam 0 is relatively great but does not reach a threshold indicating that beam 1 can serve the UE; therefore, the UE determines that beam 1 cannot serve another UE on a time-frequency resource used by beam 0; in this case, a manner for using beam 0 and beam 1 in combination is the beam selection. In this implementation manner, a usage manner of beam 0 is that beam 0 serves the UE as a serving beam of the UE, while a usage manner of beam 1 is that beam 1 cannot serve another UE on the time-frequency resource used by beam 0.

For still another example, the first threshold is 10 dB and the second threshold is 3 dB. A case of three beams is considered:

It is assumed that receive power of beam 0 is −90 dBm, receive power of beam 1 is −110 dBm, and receive power of beam 2 is −130 dBm. In this case, the UE selects beam 0 whose receive power is the greatest as a serving beam of the UE. A difference between the receive power of beam 0 and the receive power of beam 1 is greater than the first threshold, and a difference between the receive power of beam 0 and the receive power of beam 2 is also greater than the first threshold; therefore, the UE considers that interference of both beam 1 and beam 2 on beam 0 is relatively small, and therefore may determine that beam 1 and beam 2 can serve another UE on a time-frequency resource used by beam 0; in this case, a manner for using beam 0, beam 1, and beam 2 in combination is the beam multiplexing. In this implementation manner, a usage manner of beam 0 is that beam 0 serves the UE as a serving beam of the UE, while usage manners of beam 1 and beam 2 are that both beam 1 and beam 2 serve another UE on the time-frequency resource used by beam 0.

It is assumed that receive power of beam 0 is −90 dBm, receive power of beam 1 is −91 dBm, and receive power of beam 2 is −92 dBm. In this case, the UE selects beam 0 whose receive power is the greatest as a serving beam of the UE. A difference between the receive power of beam 0 and the receive power of beam 1 is less than the second threshold, and a difference between the receive power of beam 0 and the receive power of beam 2 is also less than the second threshold, which means that power of beam 1, power of beam 2, and power of beam 0 for the UE are almost equivalent and beam 1 and beam 2 can also be used as serving beams of the UE; therefore, the UE selects beam 1 and beam 2 as serving beams of the UE; in this case, a manner for using beam 0, beam 1, and beam 2 in combination is the beam cooperation. In this implementation manner, usage manners of beam 0, beam 1, and beam 2 are that beam 0, beam 1, and beam 2 all serve the UE as serving beams of the UE. Optionally, the UE may further specify working phases of beam 0, beam 1, and beam 2, so that differences between the working phases of beam 0, beam 1, and beam 2 are as small as possible, so as to obtain the greatest possible received-signal strength.

It is assumed that receive power of beam 0 is −90 dBm, receive power of beam 1 is −95 dBm, and receive power of beam 2 is −94 dBm. In this case, the UE selects beam 0 whose receive power is the greatest as a serving beam of the UE. A difference between the receive power of beam 0 and the receive power of beam 1 is greater than the second threshold and less than the first threshold, and a difference between the receive power of beam 0 and the receive power of beam 2 is also greater than the second threshold and less than the first threshold, which means that interference of both beam 1 and beam 2 on beam 0 is relatively great but does not reach a threshold indicating that beam 1 and beam 2 can serve the UE; therefore, the UE determines that beam 1 and beam 2 cannot serve another UE on a time-frequency resource used by beam 0; in this case, a manner for using beam 0, beam 1, and beam 2 in combination is the beam selection. In this implementation manner, a usage manner of beam 0 is that beam 0 serves the UE as a serving beam of the UE, while usage manners of beam 1 and beam 2 are that beam 1 and beam 2 cannot serve another UE on the time-frequency resource used by beam 0.

It is assumed that receive power of beam 0 is −90 dBm, receive power of beam 1 is −91 dBm, and receive power of beam 2 is −130 dBm. In this case, the UE selects beam 0 whose receive power is the greatest as a serving beam. A difference between the receive power of beam 0 and the receive power of beam 1 is less than the second threshold, which means that power values of beam 1 and beam 0 for the UE are almost equivalent and beam 1 can also be used as a serving beam of the UE; therefore, the UE also selects beam 1 as a serving beam; in this case, a manner for using beam 0 and beam 1 in combination is the beam cooperation. A difference between the receive power of beam 0 and the receive power of beam 2 is greater than the first threshold; therefore, the UE considers that interference of beam 2 on beam 0 is relatively small, and therefore may determine that beam 2 can serve another UE on a time-frequency resource used by beam 0; in this case, a manner for using beam 0 and beam 2 in combination is the beam multiplexing. It can be seen that in this implementation manner, a manner for using beam 0, beam 1 and beam 2 in combination is a combination of the beam cooperation and the beam multiplexing. In this implementation manner, usage manners of beam 0 and beam 1 are that beam 0 and beam 1 serve the UE as serving beams of the UE, while a usage manner of beam 2 is that beam 2 serves another UE on the time-frequency resource used by beam 0. Optionally, the UE may further specify working phases of beam 0 and beam 1, so that a difference between the working phases of beam 0 and beam 1 is as small as possible, so as to obtain the greatest possible received-signal strength.

It is assumed that receive power of beam 0 is −90 dBm, receive power of beam 1 is −91 dBm, and receive power of beam 2 is −95 dBm. In this case, the UE selects beam 0 whose receive power is the greatest as a serving beam of the UE. A difference between the receive power of beam 0 and the receive power of beam 1 is less than the second threshold, which means that power values of beam 1 and beam 0 for the UE are almost equivalent and beam 1 can also be used as a serving beam of the UE; therefore, the UE also selects beam 1 as a serving beam; in this case, a manner for using beam 0 and beam 1 in combination is the beam cooperation. A difference between the receive power of beam 0 and the receive power of beam 2 is greater than the second threshold and less than the first threshold, which means that interference of beam 2 on beam 0 is relatively great but does not reach a threshold indicating that beam 2 can serve the UE; therefore, the UE determines that beam 2 cannot serve another UE on a time-frequency resource used by beam 0; in this case, a manner for using beam 0 and beam 2 in combination is the beam selection. In this implementation manner, a manner for using beam 0, beam 1 and beam 2 in combination is a combination of the beam cooperation and the beam selection. In this implementation manner, usage manners of beam 0 and beam 1 are that beam 0 and beam 1 serve the UE as serving beams of the UE, while a usage manner of beam 2 is that beam 2 cannot serve another UE on the time-frequency resource used by beam 0. Optionally, the UE may further specify working phases of beam 0 and beam 1, so that a difference between the working phases of beam 0 and beam 1 is as small as possible, so as to obtain the greatest possible received-signal strength.

It is assumed that receive power of beam 0 is −90 dBm, receive power of beam 1 is −85 dBm, and receive power of beam 2 is −130 dBm. In this case, the UE selects beam 0 whose receive power is the greatest as a serving beam of the UE. A difference between the receive power of beam 0 and the receive power of beam 1 is greater than the second threshold and less than the first threshold, which means that interference of beam 1 on beam 0 is relatively great but does not reach a threshold indicating that beam 1 can serve the UE; therefore, the UE determines that beam 1 cannot serve another UE on a time-frequency resource used by beam 0; in this case, a manner for using beam 0 and beam 1 in combination is the beam selection. A difference between the receive power of beam 0 and the receive power of beam 2 is greater than the first threshold, which means that interference of beam 2 on beam 0 is relatively small; therefore, the UE may determine that beam 2 can serve another UE on the time-frequency resource used by beam 0; in this case, a manner for using beam 0 and beam 2 in combination is the beam multiplexing. In this implementation manner, a manner for using beam 0, beam 1 and beam 2 in combination is a combination of the beam selection and the beam multiplexing. In this implementation manner, a usage manner of beam 0 is that beam 0 serves the UE as a serving beam of the UE, while a usage manner of beam 1 is that beam 1 cannot serve another UE on the time-frequency resource used by beam 0, and a usage manner of beam 2 is that beam 2 can serve another UE on the time-frequency resource used by beam 0.

The foregoing description in which the first threshold is 10 dB and the second threshold is 3 dB is merely an example, and in an actual system, values of the two thresholds may be optimized according to a network deployment situation.

In the foregoing implementation manners, after determining the usage manners of the beams, the UE can obtain the first beam combination usage result, and then indicate the first beam combination usage result by using the beam precoding manner.

In an optional implementation manner, the UE preconfigures a beam precoding table, where a correspondence between various beam combination usage results and index values is stored in the beam precoding table, and the various beam combination usage results in the beam precoding table are indicated by using beam precoding manners. Separately using two beams and three beams as examples, implementation manners of the beam precoding table are respectively shown in Table 1 and Table 2. Symbols in Table 1 and Table 2 are described as follows: "1" represents a serving beam; "*" represents a beam that can serve another UE on a time-frequency resource used by the serving beam in the beam multiplexing manner; "0" represents a beam that cannot serve another UE on the time-frequency resource used by the serving beam in the beam selection manner; "j" represents another serving beam in the beam cooperation manner, and indicates that a difference between phases of the serving beam and the serving beam represented by "1" is 90°; "-j" represents another serving beam in the beam cooperation manner, and indicates that a difference between phases of the serving beam and the serving beam represented by "1" is -90°; and "-1" represents another serving beam in the beam cooperation manner, and indicates that a difference between phases of the serving beam and the serving beam represented by "1" is 180°. It should be noted herein that symbols used to represent the usage manners of the beams are not limited to "0", "1", "j", "-j", "-1", and "*" that are used in Table 1 and Table 2.

TABLE 1

| Index value (Index) | Beam 0 | Beam 1 | Beam combination usage manner |
|---|---|---|---|
| 0 | 1 | 0 | Beam selection |
| 1 | 0 | 1 | Beam selection |
| 2 | 1 | * | Beam multiplexing |
| 3 | * | 1 | Beam multiplexing |
| 4 | 1 | 1 | Beam cooperation |
| 5 | 1 | j | Beam cooperation |
| 6 | 1 | -j | Beam cooperation |
| 7 | 1 | -1 | Beam cooperation |

Using Table 1 as an example, in the case of two beams, there are two beam combination usage results corresponding to the beam selection manner, two beam combination usage results corresponding to the beam multiplexing manner, and four beam combination usage results corresponding to the beam cooperation manner. The beam combination manner is not limited to the four beam combination usage results provided in Table 1, for example, there may be more phase combinations for the two beams, so as to obtain more beam combination usage results.

In Table 1, a beam combination usage result corresponding to an index value 0 represents: beam 0 is selected as a serving beam of the UE, and beam 1 cannot serve another UE on a time-frequency resource used by beam 0; correspondingly, "10" is a corresponding beam precoding manner. A beam combination usage result corresponding to an index value 1 represents: beam 1 is selected as a serving beam of the UE, and beam 0 cannot serve another UE on a time-frequency resource used by beam 1; correspondingly, "01" is a corresponding beam precoding manner.

In Table 1, a beam combination usage result corresponding to an index value 2 represents: beam 0 is selected as a serving beam of the UE, and beam 1 needs to serve another UE on a time-frequency resource used by beam 0; correspondingly, "1" is a corresponding beam precoding manner. A beam combination usage result corresponding to an index value 3 represents: beam 1 is selected as a serving beam of the UE, and beam 0 needs to serve another UE on a time-frequency resource used by beam 1; correspondingly, "*1" is a corresponding beam precoding manner.

In Table 1, a beam combination usage result corresponding to an index value 4 represents: beam 0 and beam 1 are selected as serving beams of the UE, beam 0 and beam 1 use a same time-frequency resource, and phases of beam 0 and beam 1 are not adjusted; correspondingly, "11" is a corresponding beam precoding manner. A beam combination usage result corresponding to an index value 5 represents: beam 0 and beam 1 are selected as serving beams of the UE, beam 0 and beam 1 use a same time-frequency resource, a phase of beam 0 is not adjusted, and a phase of beam 1 is adjusted by 90°; correspondingly, "1j" is a corresponding beam precoding manner. A beam combination usage result corresponding to an index value 6 represents: beam 0 and beam 1 are selected as serving beams of the UE, beam 0 and beam 1 use a same time-frequency resource, a phase of beam 0 is not adjusted, and a phase of beam 1 is adjusted by -90°; correspondingly, "1-j" is a corresponding beam precoding manner. A beam combination usage result corresponding to an index value 7 represents: beam 0 and beam 1 are selected as serving beams of the UE, beam 0 and beam 1 use a same time-frequency resource, a phase of beam 0 is not adjusted, and a phase of beam 1 is adjusted by 180°; correspondingly, "1-1" is a corresponding beam precoding manner. In this embodiment, it is assumed that after a phase of one serving beam is adjusted, the two serving beams have a same phase; in this way, a signal strength that is obtained by adding up signals of the two serving beams is the greatest.

Using three beams as an example, an implementation manner of the beam precoding table is shown in Table 2.

TABLE 2

| Index value (Index) | Beam 0 | Beam 1 | Beam 2 | Beam combination usage manner |
|---|---|---|---|---|
| 0 | 1 | 0 | 0 | Beam selection |
| 1 | 0 | 1 | 0 | Beam selection |
| 2 | 0 | 0 | 1 | Beam selection |
| 3 | 1 | 0 | * | Beam selection + beam multiplexing |
| 4 | * | 0 | 1 | Beam selection + beam multiplexing |
| 5 | 1 | * | * | Beam multiplexing |
| 6 | * | 1 | * | Beam multiplexing |
| 7 | * | * | 1 | Beam multiplexing |
| 8 | 1 | 1 | 0 | Beam cooperation + beam selection |

TABLE 2-continued

| Index value (Index) | Beam 0 | Beam 1 | Beam 2 | Beam combination usage manner |
|---|---|---|---|---|
| 9 | 1 | −1 | 0 | Beam cooperation + beam selection |
| 10 | 0 | 1 | 1 | Beam cooperation + beam selection |
| 11 | 0 | 1 | −1 | Beam cooperation + beam selection |
| 12 | 1 | 1 | * | Beam cooperation + beam multiplexing |
| 13 | 1 | −1 | * | Beam cooperation + beam multiplexing |
| 14 | * | 1 | 1 | Beam cooperation + beam multiplexing |
| 15 | * | 1 | −1 | Beam cooperation + beam multiplexing |
| 16 | 1 | 1 | 1 | Beam cooperation |
| 17 | 1 | 1 | −1 | Beam cooperation |
| 18 | 1 | −1 | 1 | Beam cooperation |
| 19 | 1 | −1 | −1 | Beam cooperation |

Using Table 2 as an example, in the case of three beams, there are three beam combination usage results corresponding to the beam selection manner, three beam combination usage results corresponding to the beam multiplexing manner, four beam combination usage results corresponding to the beam cooperation manner, two beam combination usage results corresponding to the manner of combining the beam selection and the beam multiplexing, four beam combination usage results corresponding to the manner of combining the beam cooperation and the beam selection, and four beam combination usage results corresponding to the manner of combining the beam cooperation and the beam multiplexing. All beam combination usage results when the beam combination manner is involved in Table 2 are not limited to the beam combination usage results provided in Table 2. There may be more phase combinations for the three beams, so as to obtain more beam combination usage results.

In Table 2, a beam combination usage result corresponding to an index value 0 represents: beam 0 is selected to serve the UE, and beam 1 and beam 2 are not allowed to serve another UE on a time-frequency resource used by beam 0; correspondingly, "100" is a corresponding beam precoding manner. A beam combination usage result corresponding to an index value 1 represents: beam 1 is selected as a serving beam of the UE, and beam 0 and beam 2 cannot serve another UE on a time-frequency resource used by beam 1; correspondingly, "010" is a corresponding beam precoding manner. A beam combination usage result corresponding to an index value 2 represents: beam 2 is selected as a serving beam of the UE, and beam 0 and beam 1 cannot serve another UE on a time-frequency resource used by beam 2; correspondingly, "001" is a corresponding beam precoding manner.

In Table 2, a beam combination usage result corresponding to an index value 3 represents: beam 0 is selected as a serving beam of the UE, beam 1 cannot serve another UE on a time-frequency resource used by beam 0, and beam 2 needs to serve another UE on the time-frequency resource used by beam 0; correspondingly, "10*" is a corresponding beam precoding manner. A beam combination usage result corresponding to an index value 4 represents: beam 2 is selected as a serving beam of the UE, beam 1 cannot serve another UE on a time-frequency resource used by beam 2, and beam 0 needs to serve another UE on the time-frequency resource used by beam 2; correspondingly, "*01" is a corresponding beam precoding manner.

In Table 2, a beam combination usage result corresponding to an index value 5 represents: beam 0 is selected as a serving beam of the UE, and beam 1 and beam 2 need to serve another UE on a time-frequency resource used by beam 0; correspondingly, "1**" is a corresponding beam precoding manner. A beam combination usage result corresponding to an index value 6 represents: beam 1 is selected as a serving beam of the UE, and beam 0 and beam 2 need to serve another UE on a time-frequency resource used by beam 1; correspondingly, "*1*" is a corresponding beam precoding manner. A beam combination usage result corresponding to an index value 7 represents: beam 2 is selected as a serving beam of the UE, and beam 1 and beam 0 need to serve another UE on a time-frequency resource used by beam 2; correspondingly, "**1" is a corresponding beam precoding manner.

In Table 2, a beam combination usage result corresponding to an index value 8 represents: beam 0 and beam 1 are selected as serving beams of the UE, and phases of beam 1 and beam 0 are not adjusted, and beam 2 cannot serve another UE on a time-frequency resource used by beam 0 and beam 1; correspondingly, "110" is a corresponding beam precoding manner. A beam combination usage result corresponding to an index value 9 represents: beam 0 and beam 1 are selected as serving beams of the UE, a phase of beam 0 is not adjusted, a phase of beam 1 is adjusted by 180°, and beam 2 cannot serve another UE on a time-frequency resource used by beam 0 and beam 1; correspondingly, "1-10" is a corresponding beam precoding manner. A beam combination usage result corresponding to an index value 10 represents: beam 1 and beam 2 are selected as serving beams of the UE, and phases of beam 1 and beam 2 are not adjusted, and beam 0 cannot serve another UE on a time-frequency resource used by beam 1 and beam 2; correspondingly, "011" is a corresponding beam precoding manner. A beam combination usage result corresponding to an index value 11 represents: beam 1 and beam 2 are selected as serving beams of the UE, a phase of beam 1 is not adjusted, a phase of beam 2 is adjusted by 180°, and beam 0 cannot serve another UE on a time-frequency resource used by beam 1 and beam 2; correspondingly, "01-1" is a corresponding beam precoding manner.

In Table 2, a beam combination usage result corresponding to an index value 12 represents: beam 0 and beam 1 are selected as serving beams of the UE, and phases of beam 0 and beam 1 are not adjusted, and beam 2 needs to serve another UE on a time-frequency resource used by beam 0 and beam 1; correspondingly, "11*" is a corresponding beam precoding manner. A beam combination usage result corresponding to an index value 13 represents: beam 0 and beam 1 are selected as serving beams of the UE, a phase of beam 0 is not adjusted, a phase of beam 1 is adjusted by 180°, and beam 2 needs to serve another UE on a time-frequency resource used by beam 0 and beam 1; correspondingly, "1-1" is a corresponding beam precoding manner. A beam combination usage result corresponding to an index value 14 represents: beam 1 and beam 2 are selected as serving beams of the UE, and phases of beam 1 and beam 2 are not adjusted, and beam 0 needs to serve another UE on a time-frequency resource used by beam 1 and beam 2; correspondingly, "*11" is a corresponding beam precoding manner. A beam combination usage result corresponding to an index value 15 represents: beam 1 and beam 2 are selected as serving beams of the UE, a phase of beam 1 is not adjusted, a phase of beam 2 is adjusted by 180°, and beam 0 needs to serve another UE on a time-frequency resource used by beam 1 and beam 2; correspondingly, "*1-1" is a corresponding beam precoding manner.

In Table 2, a beam combination usage result corresponding to an index value 16 represents: beam 0, beam 1, and beam 2 are selected as serving beams of the UE, and phases of beam 0, beam 1, and beam 2 are not adjusted; correspondingly, "111" is a corresponding beam precoding manner. A beam combination usage result corresponding to an index value 17 represents: beam 0, beam 1, and beam 2 are selected as serving beams of the UE, phases of beam 0 and beam 1 are not adjusted, and a phase of beam 2 is adjusted by 180°; correspondingly, "11-1" is a corresponding beam precoding manner. A beam combination usage result corresponding to an index value 18 represents: beam 0, beam 1, and beam 2 are selected as serving beams of the UE, phases of beam 0 and beam 2 are not adjusted, and a phase of beam 1 is adjusted by 180°; correspondingly, "1-11" is a corresponding beam precoding manner. A beam combination usage result corresponding to an index value 19 represents: beam 0, beam 1, and beam 2 are selected as serving beams of the UE, a phase of beam 0 is not adjusted, and phases of beam 1 and beam 2 are adjusted by 180°; correspondingly, "1-1-1" is a corresponding beam precoding manner.

Based on the foregoing beam precoding table, an implementation manner of step 102 includes: performing, by the UE, matching in a preset beam precoding table according to the beam precoding manner, to acquire an index value corresponding to the beam precoding manner; and sending, by the UE, the index value corresponding to the beam precoding manner to the base station. Specifically, the UE may first determine a used beam combination usage manner, and then perform matching in the beam precoding table according to the beam precoding manner and the determined beam combination usage manner, to determine a matching index value corresponding to the beam combination usage result, where the index value is an index value corresponding to the beam precoding manner.

The base station also preconfigures the beam precoding table. After receiving the index value that is sent by the UE and that corresponds to the beam precoding manner, the base station performs matching in the beam precoding table according to the index value, to determine a matching beam combination usage result, and then schedules the UE based on the obtained beam combination usage result.

In an optional implementation manner, the UE may send the beam precoding manner used by the UE to the base station after a rank indication (RI) subframe; or the UE may send the beam precoding manner used by the UE to the base station before an RI subframe. Optionally, based on the foregoing beam precoding table, the UE may specifically send the index value corresponding to the beam precoding manner used by the UE to the base station before or after the RI subframe.

Optionally, after the UE sends the index value corresponding to the beam precoding manner used by the UE to the base station, a PMI, a CQI, and the like that are subsequently reported by the UE to the base station are all based on the beam precoding manner used by the UE.

Figure 2:
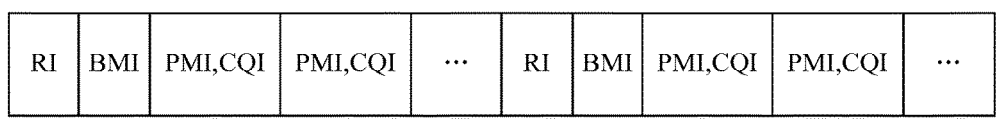
FIG. 2 is a schematic diagram of a sequence in which UE reports an RI, a BMI, a PMI, and a CQI to a base station according to an embodiment of the present disclosure.

For ease of illustration, a frame in which the UE reports the index value corresponding to the beam precoding manner used by the UE to the base station is marked as a beam matrix indication (BMI) subframe. For example, a schematic diagram of a sequence in which UE reports an RI, a BMI, a PMI, and a CQI to a base station is shown in FIG. 2. The reporting sequence shown in FIG. 2 and the beam precoding table shown in Table 1 are used as examples. If the UE reports that beam 0 corresponding to the beam selection manner is selected (specifically reports the index value 0) to the base station in the BMI subframe, the following PMI and CQI are both based on the assumption that "beam 0 is selected", that is, only a PMI and a CQI that correspond to a channel state of beam 0 are fed back. If the UE reports that beam 1 corresponding to the beam selection manner is selected (specifically reports the index value 1) to the base station in the BM subframe, the following PMI and CQI are both based on the assumption that "beam 1 is selected", that is, only a PMI and a CQI that correspond to a channel state of beam 1 are fed back. If the UE reports that beam 0 and beam 1 corresponding to the beam cooperation manner are selected and phases of beam 0 and beam 1 are respectively {1, +j} (specifically reports the index value 5) to the base station in the BMI subframe, the following PMI and CQI are both based on the assumption that "beam 0 and beam 1 corresponding to the beam cooperation manner are selected and phases of beam 0 and beam 1 are respectively {1, +j}", that is, a PMI and a CQI that correspond to a joint channel state of beam 0 and beam 1 are fed back. If the UE reports that beam 0 and beam 1 corresponding to the beam cooperation manner are selected and phases of beam 0 and beam 1 are respectively {1, −j} (specifically reports the index value 6) to the base station in the BMI subframe, the following PMI and CQI are both based on the assumption that "beam 0 and beam 1 corresponding to the beam cooperation manner are selected and phases of beam 0 and beam 1 are respectively {1, −j}", that is, a PMI and a CQI that correspond to a joint channel state of beam 0 and beam 1 are fed back.

In this embodiment, when using beams in combination, UE determines usage manners of the beams, to form a first beam combination usage result, and indicates the first beam combination usage result by using a beam precoding manner, and then sends the beam precoding manner to a base station, so that the base station schedules the UE based on the beam precoding manner. In this embodiment, a beam combination usage manner used in a process of determining the beam precoding manner is not limited to beam multiplexing, but includes beam selection, beam multiplexing, and beam cooperation. Therefore, a beam combination usage manner can be selected flexibly according to inter-beam interference. For example, when inter-beam interference is relatively small, the method of beam multiplexing may be used, to increase a system throughput; when inter-beam interference is relatively great, another method such as the beam selection or the beam cooperation may be used, to avoid inter-beam interference and improve strength of a wanted signal, thereby increasing a system throughput.

Figure 3:
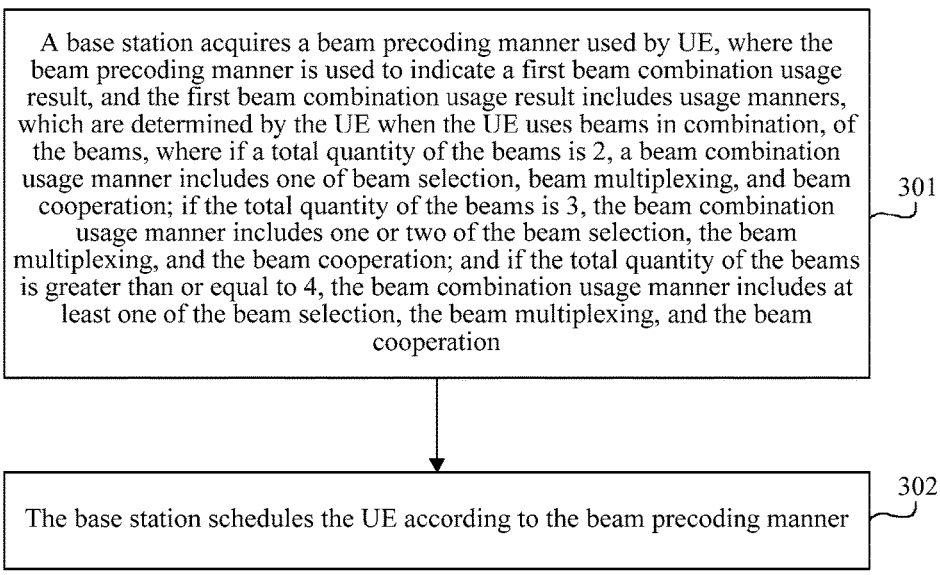
FIG. 3 is a flowchart of a scheduling method according to an embodiment of the present disclosure.

FIG. 3 is a flowchart of a scheduling method according to an embodiment of the present disclosure. As shown in FIG. 3, the method includes:

301: A base station acquires a beam precoding manner used by UE, where the beam precoding manner is used to indicate a first beam combination usage result, and the first beam combination usage result includes usage manners, which are determined by the UE when the UE uses beams in combination, of the beams, where if a total quantity of the beams is 2, a beam combination usage manner includes one of beam selection, beam multiplexing, and beam cooperation; if the total quantity of the beams is 3, the beam combination usage manner includes one or two of the beam selection, the beam multiplexing, and the beam cooperation; and if the total quantity of the beams is greater than or equal to 4, the beam combination usage manner includes at least one of the beam selection, the beam multiplexing, and the beam cooperation.

302: The base station schedules the UE according to the beam precoding manner.

In this embodiment, the beam precoding manner used by the UE is used to indicate a first beam combination usage result, and the first beam combination usage result includes usage manners, which are determined by the UE when the UE uses beams in combination, of the beams. Unlike the prior art in which a beam combination usage manner includes only beam multiplexing, in this embodiment, a beam combination usage manner includes beam selection, beam multiplexing, and beam cooperation, and therefore, the usage manners of the beams included in the first beam combination usage result are no longer limited to one manner, that is, multiplexing. In this embodiment, because there are many beam combination usage manners, the UE can flexibly select a beam combination usage manner according to inter-beam interference. For example, when inter-beam interference is relatively small, the beam multiplexing manner may be selected, to increase a system throughput; when inter-beam interference is relatively great, another manner such as the beam selection or the beam cooperation may be selected, to avoid inter-beam interference and improve strength of a wanted signal, thereby increasing a system throughput. For a specific description about the determining of the beam precoding manner by the UE, reference may be made to the foregoing embodiment, and details are not described herein again.

After determining the beam precoding manner, the UE reports the beam precoding manner to the base station; in this way, the base station may schedule the UE according to the beam precoding manner. Before scheduling the UE, the base station needs to first acquire the beam precoding manner used by the UE, and then schedule the UE based on the acquired beam precoding manner.

For example, the beam combination usage manner involved in this embodiment may be one of the beam selection, the beam multiplexing, and the beam cooperation. For another example, the beam combination usage manner involved in this embodiment may be a combination of any two of the beam selection, the beam multiplexing, and the beam cooperation. For another example, the beam combination usage manner involved in this embodiment may be a combination of the beam selection, the beam multiplexing, and the beam cooperation. The beam combination usage manner may be decided by a quantity of beams to some degree. For example, if the total quantity of the beams is 2, the beam combination usage manner may be one of the beam selection, the beam multiplexing, and the beam cooperation; if the total quantity of the beams is 3, the beam combination usage manner may be any one of or a combination of any two of the beam selection, the beam multiplexing, and the beam cooperation; and if the total quantity of the beams is greater than or equal to 4, the beam combination usage manner may be at least one of the beam selection, the beam multiplexing, and the beam cooperation.

It should be noted herein that in this embodiment of the present disclosure, the beam selection refers to: it is required that at least one beam among the beams that is different from a serving beam cannot serve another UE on a time-frequency resource used by the serving beam, where the serving beam refers to a beam that serves the UE.

In this embodiment of the present disclosure, the beam multiplexing refers to: it is required that at least one beam among the beams that is different from a serving beam serves another UE on a time-frequency resource used by the serving beam.

In this embodiment of the present disclosure, the beam cooperation refers to: it is required that at least two beams that use a same time-frequency resource among the beams are used as serving beams.

For descriptions about examples of the beam selection, the beam multiplexing, and the beam cooperation, reference may be made to the foregoing embodiment, and details are not described herein again.

Meanings of a manner of combining the beam selection and the beam multiplexing, a manner of combining the beam selection and the beam cooperation, a manner of combining the beam multiplexing and the beam cooperation, and a manner of combining the beam selection, the beam multiplexing, and the beam cooperation can be obtained by directly combining the foregoing meanings of the beam selection, the beam multiplexing, and the beam selection. For descriptions about specific examples, reference may be made to the foregoing embodiment, and details are not described herein again.

In an optional implementation manner, a beam precoding table is preconfigured on both a UE side and a base station side, and a correspondence between various beam combination usage results and index values is stored in the beam precoding table. For an implementation manner of the beam precoding table on the base station side, reference may be made to Table 1 or Table 2.

Based on this, an optional implementation manner of step 301, that is, a base station acquires a beam precoding manner used by UE, includes: receiving, by the base station, an index value that corresponds to the beam precoding manner and that is sent by the UE; and performing, by the base station, matching in a preset beam precoding table according to the index value corresponding to the beam precoding manner, and determining a beam combination usage result that matches the index value corresponding to the beam precoding manner.

In an optional implementation manner, an implementation manner of step 302, that is, the base station schedules the UE according to the beam precoding manner, includes: determining, by the base station, a serving beam of the UE among the beams and a usage manner of another beam according to the first beam combination usage result indicated by the beam precoding manner; and allocating a time-frequency resource to the serving beam of the UE, transmitting data to the UE on the time-frequency resource by using the serving beam, and transmitting data according to the usage manner of the another beam by using the another beam.

The usage manner of the another beam may be: the another beam cannot be used to transmit data to another UE on the time-frequency resource used by the serving beam; in this case, the process of transmitting, by the base station, data according to the usage manner of the another beam by using the another beam includes: forbidding, by the base station, use of the another beam to transmit data to another UE on the time-frequency resource used by the serving beam. For example, the base station may transmit, by using the another beam, data to another UE on a time-frequency resource different from the time-frequency resource used by the serving beam. The time-frequency resource different from the time-frequency resource used by the serving beam may be determined by the base station, and the another UE may also be determined by the base station based on a beam precoding manner of each UE.

The usage manner of the another beam may also be: the another beam needs to be used to transmit data to another UE on the time-frequency resource used by the serving beam; in this case, the process of transmitting, by the base station, data according to the usage manner of the another beam by using the another beam includes: transmitting, by the base station by using the another beam, data to another UE on the time-frequency resource used by the serving beam. The another UE may also be determined by the base station based on a beam precoding manner of each UE.

Further, optionally, when the beam combination usage manner involves the case of the beam cooperation, the UE has at least two serving beams, and in this case, phases of the at least two serving beams may be the same or may be different. For the UE, to obtain the greatest possible received-signal strength, it may be required that some or all serving beams work at specified phases. Therefore, the base station may need to adjust a phase of a serving beam, and the information that a phase of a serving beam needs to be adjusted also belongs to a part of information in the beam precoding manner used by the UE. Based on this, if the beam combination usage manner includes the beam cooperation, before transmitting, by using the serving beam, data to the UE on the time-frequency resource allocated to the serving beam, the base station may further determine a working phase of each serving beam according to the beam precoding manner used by the UE, and if the serving beam does not work at the determined phase, adjust a phase of the serving beam, so that the serving beam works at the determined phase. Correspondingly, the transmitting, by the base station by using the serving beam, data to the UE on the time-frequency resource allocated to the serving beam includes: transmitting, by the base station, data to the UE on the time-frequency resource by using the serving beam whose phase is already adjusted. Adjusting a serving beam refers to adjusting a phase of the serving beam to a phase specified by the UE.

In an optional implementation manner, the precoding manner used by the UE indicates a received-signal phase of a reference serving beam among serving beams and a difference between the received-signal phase of the reference serving beam and a received-signal phase of another serving beam. Therefore, the determining, by the base station, a working phase of each serving beam according to the beam precoding manner used by the UE includes: determining, by the base station, a received-signal phase of a reference serving beam and a difference between the received-signal phase of the reference serving beam and a received-signal phase of another serving beam according to the beam precoding manner; and using the received-signal phase of the reference serving beam as a working phase of the reference serving beam, and adding the received-signal phase of the reference serving beam to the difference between the received-signal phase of the reference serving beam and the received-signal phase of the another serving beam, to obtain a working phase of the another serving beam.

The following describes step 302 in detail with reference to specific cases of the first beam combination usage result.

One case: The beam combination usage manner is the beam selection; therefore, the first beam combination usage result includes: a usage manner of a first beam is that the first beam is used as a serving beam of the UE, and a usage manner of another beam is that the another beam cannot serve another UE on a time-frequency resource of the serving beam. Therefore, an implementation manner of step 302 includes: allocating, by the base station, a time-frequency resource to the first beam used as a serving beam; and transmitting, by the base station, data to the UE on the allocated time-frequency resource by using the first beam, and forbidding use of the another beam to transmit data to another UE on the time-frequency resource, where the base station may transmit data to another UE on another time-frequency resource different from the time-frequency resource by using the another beam.

Another case: The beam combination usage manner is the beam selection and the beam multiplexing; therefore, the first beam combination usage result includes: a usage manner of a first beam is that the first beam is used as a serving beam of the UE, a usage manner of a second beam is that the second beam cannot serve another UE on a time-frequency resource of the serving beam, and a usage manner of a third beam is that the third beam needs to serve another UE on the time-frequency resource of the serving beam. Quantities of second beams and third beams are not limited to one. Therefore, an implementation manner of step 302 includes: allocating, by the base station, a time-frequency resource to the first beam used as a serving beam; and transmitting, by the base station, data to the UE on the allocated time-frequency resource by using the first beam, transmitting data to another UE on the time-frequency resource by using the third beam, and forbidding use of the second beam to transmit data to another UE on the time-frequency resource.

Still another case: The beam combination usage manner is the beam multiplexing; therefore, the first beam combination usage result includes: a usage manner of a first beam is that the first beam is used as a serving beam of the UE, and a usage manner of another beam is that the another beam needs to serve another UE on a time-frequency resource of the serving beam. Therefore, an implementation manner of step 302 includes: allocating, by the base station, a time-frequency resource to the first beam used as a serving beam; and transmitting, by the base station, data to the UE on the allocated time-frequency resource by using the first beam, and transmitting data to another UE on the time-frequency resource by using the another beam.

Still another case: The beam combination usage manner is the beam cooperation; therefore, the first beam combination usage result includes: a usage manner of a first beam is that the first beam is used as a serving beam of the UE and works at a first phase, and a usage manner of a second beam is that the second beam is used as a serving beam of the UE and works at a second phase. The first phase and second phase herein may be the same, or may be different. Therefore, an implementation manner of step 302 includes: allocating, by the base station, a time-frequency resource to the first beam and the second beam that are used as serving beams; and transmitting, by the base station, data to the UE on the allocated time-frequency resource by using the first beam and the second beam. Optionally, if the first beam does not work at the first phase, the base station needs to perform phase adjustment on the first beam, so that the first beam works at the first phase, and then transmit data to the UE on the allocated time-frequency resource by using the first beam whose phase is already adjusted. Optionally, if the second beam does not work at the second phase, the base station determines that phase adjustment needs to be performed on the second beam, so that the second beam works at the second phase, and then transmits data to the UE on the allocated time-frequency resource by using the second beam whose phase is already adjusted. The base station may only need to perform phase adjustment on the first beam, or may only need to perform phase adjustment on the second beam, or may need to perform phase adjustment on both the first beam and the second beam.

Still another case: The beam combination usage manner includes the beam selection and the beam cooperation; therefore, the first beam combination usage result includes:

a usage manner of a first beam is that the first beam is used as a serving beam of the UE and works at a first phase, a usage manner of a second beam is that the second beam is used as a serving beam of the UE and works at a second phase, and a usage manner of another beam is that the another beam cannot serve another UE on a time-frequency resource used by the serving beams. Therefore, an implementation manner of step 302 includes: allocating, by the base station, a time-frequency resource to the first beam and the second beam that are used as serving beams; if necessary, further performing, by the base station, corresponding phase adjustment on the first beam and/or the second beam; and transmitting, by the base station, data to the UE on the allocated time-frequency resource by using the first beam and the second beam or by using the first beam and the second beam whose phases are already adjusted, and forbidding use of the another beam except the first beam and the second beam to transmit data to another UE on the time-frequency resource.

Still another case: The beam combination usage manner includes the beam multiplexing and the beam cooperation; therefore, the first beam combination usage result includes: a usage manner of a first beam is that the first beam is used as a serving beam of the UE and works at a first phase, a usage manner of a second beam is that the second beam is used as a serving beam of the UE and works at a second phase, and a usage manner of another beam is that the another beam serves another UE on a time-frequency resource used by the serving beams. Therefore, an implementation manner of step 302 includes: allocating, by the base station, a time-frequency resource to the first beam and the second beam that are used as serving beams; if necessary, further performing, by the base station, corresponding phase adjustment on the first beam and/or the second beam; and transmitting, by the base station, data to the UE on the allocated time-frequency resource by using the first beam and the second beam or by using the first beam and the second beam whose phases are already adjusted, and transmitting data to another UE on the time-frequency resource by using the another beam except the first beam and the second beam.

It can be seen from the foregoing that, in this embodiment, a base station schedules UE based on a beam precoding manner used by the UE. A beam combination usage manner used in a process of determining the beam precoding manner is not limited to beam multiplexing, but includes beam selection, beam multiplexing, and beam cooperation. Therefore, a beam combination usage manner can be selected flexibly according to inter-beam interference. Therefore, when the base station schedules the UE based on the precoding manner, a manner for using beams in combination is based on full consideration of inter-beam interference, which helps increase a system throughput.

Figure 4A:
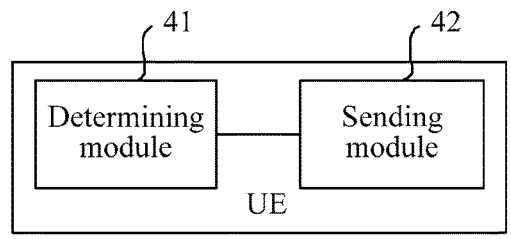
FIG. 4a is a schematic structural diagram of UE according to an embodiment of the present disclosure.

FIG. 4a is a schematic structural diagram of UE according to an embodiment of the present disclosure. As shown in FIG. 4a, the UE includes: a determining module 41 and a sending module 42.

The determining module 41 is configured to determine a beam precoding manner used by the UE, where the beam precoding manner is used to indicate a first beam combination usage result, and the first beam combination usage result includes usage manners, which are determined by the UE when the UE uses beams in combination, of the beams, where if a total quantity of the beams is 2, a beam combination usage manner includes one of beam selection, beam multiplexing, and beam cooperation; if the total quantity of the beams is 3, the beam combination usage manner includes one or two of the beam selection, the beam multiplexing, and the beam cooperation; and if the total quantity of the beams is greater than or equal to 4, the beam combination usage manner includes at least one of the beam selection, the beam multiplexing, and the beam cooperation.

The sending module 42 is configured to send the beam precoding manner determined by the determining module 41 to a base station, so that the base station schedules the UE based on the beam precoding manner.

In this embodiment, the beam selection refers to: it is required that at least one beam among the beams that is different from a serving beam cannot serve another UE on a time-frequency resource used by the serving beam;

the beam multiplexing refers to: it is required that at least one beam among the beams that is different from a serving beam serves another UE on a time-frequency resource used by the serving beam; and the beam cooperation refers to: it is required that at least two beams that use a same time-frequency resource among the beams are used as serving beams, where the serving beam refers to a beam that serves the UE in this embodiment among the beams.

In an optional implementation manner, the determining, by the determining module 41, a beam precoding manner used by the UE specifically includes: determining, according to received-signal strengths of the beams, a beam whose received-signal strength is the greatest among the beams as a first serving beam, separately comparing differences between the received-signal strength of the first serving beam and received-signal strengths of the other beams with a preset first threshold and a preset second threshold, and determining usage manners of the other beams according to a comparison result, to obtain the first beam combination usage result; and indicating the first beam combination usage result by using the beam precoding manner, where the first threshold is greater than the second threshold.

Further, optionally, the separately comparing, by the determining module 41, differences between the received-signal strength of the first serving beam and received-signal strengths of the other beams with a preset first threshold and a preset second threshold, and determining usage manners of the other beams according to a comparison result includes: separately comparing a first difference with the first threshold and the second threshold, where the first difference is a difference between the received-signal strength of the first serving beam and a received-signal strength of a second beam among the other beams, where the second beam may be any beam among the other beams; if the first difference is greater than the first threshold, determining that the second beam can serve another UE on a time-frequency resource used by the first serving beam; if the first difference is less than the second threshold, determining that the second beam serves the UE in this embodiment as a second serving beam; and if the first difference is greater than the second threshold and less than the first threshold, determining that the second beam cannot serve another UE on the time-frequency resource used by the first serving beam.

Figure 4B:
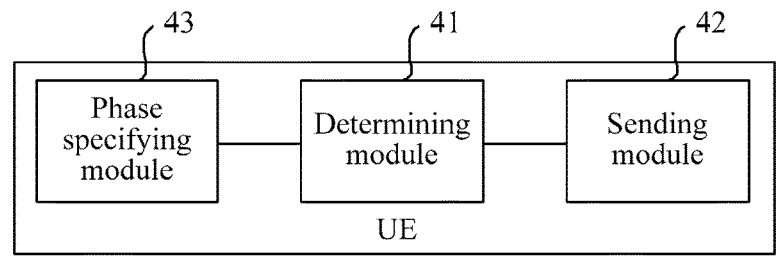
FIG. 4b is a schematic structural diagram of another UE according to an embodiment of the present disclosure.

In an optional implementation manner, as shown in FIG. 4b, the UE further includes: a phase specifying module 43. The phase specifying module 43 is configured to: when the beam combination usage manner includes the beam cooperation, specify a working phase of each serving beam according to received-signal phases of the at least two serving beams, and indicate the working phase of each serving beam by using the beam precoding manner determined by the determining module 41.

Further, optionally, the specifying, by the phase specifying module 43, a working phase of each serving beam according to received-signal phases of the at least two serving beams, and indicating the working phase of each serving beam by using the beam precoding manner specifically includes: determining a serving beam among the at least two serving beams as a reference serving beam, and obtaining a difference between a received-signal phase of the reference serving beam and a received-signal phase of another serving beam; and indicating the received-signal phase of the reference serving beam and the difference between the received-signal phase of the reference serving beam and the received-signal phase of the another serving beam by using the beam precoding manner.

In an optional implementation manner, the sending, by the sending module 42, the beam precoding manner determined by the determining module 41 to a base station specifically includes: performing matching in a preset beam precoding table according to the beam precoding manner, to acquire an index value corresponding to the beam precoding manner; and sending the index value corresponding to the beam precoding manner to the base station, where a correspondence between various beam combination usage results and index values is stored in the beam precoding table.

In an optional implementation manner, the sending, by the sending module 42, the beam precoding manner determined by the determining module 41 to a base station specifically includes: sending the beam precoding manner to the base station after an RI subframe; or sending the beam precoding manner to the base station before an RI subframe.

The functional modules of the UE provided in this embodiment may be configured to execute the procedures of the method embodiment shown in FIG. 1, and the specific working principle thereof is not described repeatedly herein. For details, reference may be made to the description of the method embodiment.

When using beams in combination, UE provided in this embodiment determines usage manners of the beams, to form a first beam combination usage result, and indicates the first beam combination usage result by using a beam precoding manner, and then sends the beam precoding manner to a base station, so that the base station schedules the UE in this embodiment based on the beam precoding manner. In this embodiment, a beam combination usage manner used by the UE in a process of determining the beam precoding manner is not limited to beam multiplexing, but includes beam selection, beam multiplexing, and beam cooperation. Therefore, a beam combination usage manner can be selected flexibly according to inter-beam interference. For example, when inter-beam interference is relatively small, the method of beam multiplexing may be used, to increase a system throughput; when inter-beam interference is relatively great, another method such as the beam selection or the beam cooperation may be used, to avoid inter-beam interference and improve strength of a wanted signal, thereby increasing a system throughput.

Figure 5:
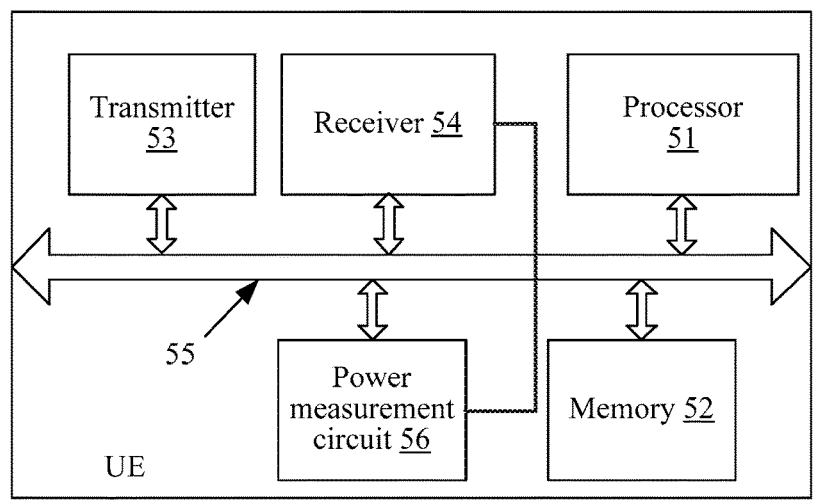
FIG. 5 is a schematic structural diagram of still another UE according to an embodiment of the present disclosure.

FIG. 5 is a schematic structural diagram of another UE according to an embodiment of the present disclosure. As shown in FIG. 5, the UE includes: a processor 51 and a transmitter 53.

The processor 51 is configured to determine a beam precoding manner used by the UE, where the beam precoding manner is used to indicate a first beam combination usage result, and the first beam combination usage result includes usage manners, which are determined by the UE when the UE uses beams in combination, of the beams.

If a total quantity of the beams is 2, a beam combination usage manner includes one of beam selection, beam multiplexing, and beam cooperation; if the total quantity of the beams is 3, the beam combination usage manner includes one or two of the beam selection, the beam multiplexing, and the beam cooperation; and if the total quantity of the beams is greater than or equal to 4, the beam combination usage manner includes at least one of the beam selection, the beam multiplexing, and the beam cooperation.

The transmitter 53 is configured to send the beam precoding manner determined by the processor 51 to a base station, so that the base station schedules the UE based on the beam precoding manner.

In this embodiment, the beam selection refers to: it is required that at least one beam among the beams that is different from a serving beam cannot serve another UE on a time-frequency resource used by the serving beam;

the beam multiplexing refers to: it is required that at least one beam among the beams that is different from a serving beam serves another UE on a time-frequency resource used by the serving beam; and the beam cooperation refers to: it is required that at least two beams that use a same time-frequency resource among the beams are used as serving beams, where the serving beam refers to a beam that serves the UE in this embodiment among the beams.

Further, the UE in this embodiment may further include a memory 52.

The memory 52 may include a read-only memory and a random access memory, and provide an instruction and data for the processor 51. A part of the memory 52 may further include a nonvolatile random access memory (NVRAM), for example, a flash memory.

The memory 52 stores the following elements that can execute a module or a data structure, or a subset of the elements, or an extended set of the elements:

an operation instruction: including various operation instructions, used to implement various operations; and an operating system: including various system programs, used to implement various basic services and process hardware-based tasks.

In this embodiment of the present disclosure, the processor 51 executes a corresponding operation by invoking the operation instruction (the operation instruction may be stored in the operating system) stored in the memory 52.

Optionally, the processor 51 can control operations of the UE in this embodiment. The processor 51 may also be referred to as a central processing unit (CPU). The memory 52 may include a read-only memory and a random access memory, and provide an instruction and data for the processor 51. A part of the memory 52 may further include a nonvolatile random access memory (NVRAM). In a specific application, components of the UE in this embodiment may be coupled together by using a bus system 55, where besides a data bus, the bus system 55 may further include a power supply bus, a control bus, a state signal bus, and the like. However, for clear description, all buses are marked as the bus system 55 in the figure. Certainly, the processor 51 may be separately coupled to other components in other manners.

The method disclosed in the foregoing embodiment of the present disclosure may be applied in the processor 51, or may be implemented by the processor 51. The processor 51 may be an integrated circuit chip having a signal processing capability. In an implementation process, each step of the method may be completed by using an integrated hardware logic circuit in the processor 51 or instructions in a software form. The processor 51 may be a general purpose processor, a digital signal processor (DSP), an application specific integrated circuit (ASIC), a field programmable gate array (FPGA), or other programmable logic devices, discrete gate or transistor logic devices, and discrete hardware components. The general purpose processor may be a microprocessor, or the processor may be any conventional processor or the like, or may be a general purpose processor or a dedicated processor. The steps disclosed with reference to the method in the embodiments of the present disclosure may be directly executed and completed by a hardware decoding processor or may be executed and completed by a combination of hardware and software modules in the decoding processor. The software module may be located in a mature storage medium in the art, such as a random access memory, a flash memory, a read-only memory, a programmable read-only memory, an electronically erasable programmable memory, or a register. The storage medium is located in the memory 52, and the processor 51 reads information in the memory 52, and completes the steps of the method in combination with the hardware thereof.

In an optional implementation manner, as shown in FIG. 5, the UE further includes: a power measurement circuit 56. The power measurement circuit 56 is configured to measure received-signal strengths of the beams. The power measurement circuit 56 may be coupled to the processor 51 by using the bus system 55, or may be coupled to the processor 51 by using another line. In an embodiment, an input end of the power measurement circuit 56 is coupled to an output end of a receiver 54, for example, a bypass of the output end of the receiver 54 is coupled to the input end of the power measurement circuit 56.

Based on the received-signal strengths of the beams obtained by the power measurement circuit 56 through measurement, the determining, by the processor 51, a beam precoding manner used by the UE specifically includes: determining, according to the received-signal strengths of the beams, a beam whose received-signal strength is the greatest among the beams as a first serving beam, separately comparing differences between the received-signal strength of the first serving beam and received-signal strengths of the other beams with a preset first threshold and a preset second threshold, and determining usage manners of the other beams according to a comparison result, to obtain the first beam combination usage result; and indicating the first beam combination usage result by using the beam precoding manner, where the first threshold is greater than the second threshold.

Further, optionally, the separately comparing, by the processor 51, differences between the received-signal strength of the first serving beam and received-signal strengths of the other beams with a preset first threshold and a preset second threshold, and determining usage manners of the other beams according to a comparison result specifically includes: separately comparing a first difference with the first threshold and the second threshold, where the first difference is a difference between the received-signal strength of the first serving beam and a received-signal strength of a second beam among the other beams, and the second beam may be any beam among the other beams; if the first difference is greater than the first threshold, determining that the second beam can serve another UE on a time-frequency resource used by the first serving beam; if the first difference is less than the second threshold, determining that the second beam serves the UE as a second serving beam; and if the first difference is greater than the second threshold and less than the first threshold, determining that the second beam cannot serve another UE on the time-frequency resource used by the first serving beam.

In an optional implementation manner, the processor 51 is further configured to: when the beam combination usage manner includes the beam cooperation, specify a working phase of each serving beam according to received-signal phases of the at least two serving beams, and indicate the working phase of each serving beam by using the beam precoding manner.

Further, optionally, the specifying, by the processor 51, a working phase of each serving beam according to received-signal phases of the at least two serving beams, and indicating the working phase of each serving beam by using the beam precoding manner specifically includes: determining a serving beam among the at least two serving beams as a reference serving beam, and obtaining a difference between a received-signal phase of the reference serving beam and a received-signal phase of another serving beam; and indicating the received-signal phase of the reference serving beam and the difference between the received-signal phase of the reference serving beam and the received-signal phase of the another serving beam by using the beam precoding manner.

In an optional implementation manner, the processor 51 is further configured to perform matching in a preset beam precoding table according to the beam precoding manner, to acquire an index value corresponding to the beam precoding manner, and provide the index value for the transmitter 53; and the sending, by the transmitter 53, the beam precoding manner determined by the processor 51 to a base station specifically includes: sending the index value that is provided by the processor 51 and that corresponds to the beam precoding manner to the base station, where a correspondence between various beam combination usage results and index values is stored in the beam precoding table.

In an optional implementation manner, the sending, by the transmitter 53, the beam precoding manner determined by the processor 51 to a base station specifically includes: sending the beam precoding manner to the base station after an RI subframe; or sending the beam precoding manner to the base station before an RI subframe.

Further, as shown in FIG. 5, the UE may further include the receiver 54. Communication between the UE and another device can be completed through cooperation between the receiver 54 and the transmitter 53.

The UE provided in this embodiment may be configured to execute the procedures of the method embodiment shown in FIG. 1, and the specific working principle thereof is not described repeatedly herein. For details, reference may be made to the description of the method embodiment.

When using beams in combination, UE provided in this embodiment determines usage manners of the beams, to form a first beam combination usage result, and indicates the first beam combination usage result by using a beam precoding manner, and then sends the beam precoding manner to a base station, so that the base station schedules the user equipment based on the beam precoding manner. In this embodiment, a beam combination usage manner used by the UE in a process of determining the beam precoding manner is not limited to beam multiplexing, but includes beam selection, beam multiplexing, and beam cooperation. Therefore, a beam combination usage manner can be selected flexibly according to inter-beam interference. For example, when inter-beam interference is relatively small, the method of beam multiplexing may be used, to increase a system throughput; when inter-beam interference is relatively great, another method such as the beam selection or the beam cooperation may be used, to avoid inter-beam interference and improve strength of a wanted signal, thereby increasing a system throughput.

Figure 6:
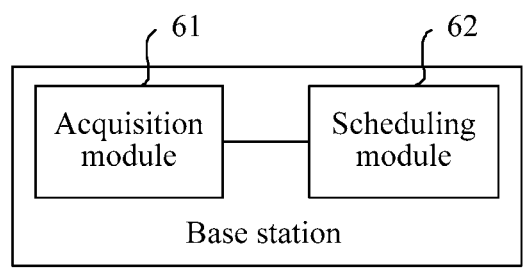
FIG. 6 is a schematic structural diagram of a base station according to an embodiment of the present disclosure.

FIG. 6 is a schematic structural diagram of a base station according to an embodiment of the present disclosure. As shown in FIG. 6, the base station includes: an acquisition module 61 and a scheduling module 62.

The acquisition module 61 is configured to acquire a beam precoding manner used by UE, where the beam precoding manner is used to indicate a first beam combination usage result, and the first beam combination usage result includes usage manners, which are determined by the UE when the UE uses beams in combination, of the beams.

If a total quantity of the beams is 2, a beam combination usage manner includes one of beam selection, beam multiplexing, and beam cooperation; if the total quantity of the beams is 3, the beam combination usage manner includes one or two of the beam selection, the beam multiplexing, and the beam cooperation; and if the total quantity of the beams is greater than or equal to 4, the beam combination usage manner includes at least one of the beam selection, the beam multiplexing, and the beam cooperation.

The scheduling module 62 is configured to schedule the UE according to the beam precoding manner acquired by the acquisition module 61.

In this embodiment, the beam selection refers to: it is required that at least one beam among the beams that is different from a serving beam cannot serve another UE on a time-frequency resource used by the serving beam;

the beam multiplexing refers to: it is required that at least one beam among the beams that is different from a serving beam serves another UE on a time-frequency resource used by the serving beam; and the beam cooperation refers to: it is required that at least two beams that use a same time-frequency resource among the beams are used as serving beams, where the serving beam refers to a beam that serves the UE in this embodiment among the beams.

In an optional implementation manner, the acquiring, by the acquisition module 61, a beam precoding manner used by UE specifically includes: receiving an index value that corresponds to the beam precoding manner and that is sent by the UE; and performing matching in a preset beam precoding table according to the index value corresponding to the beam precoding manner, and determining a beam combination usage result that matches the index value corresponding to the beam precoding manner, where a correspondence between various beam combination usage results and index values is stored in the beam precoding table.

In an optional implementation manner, the scheduling, by the scheduling module 62, the UE according to the beam precoding manner acquired by the acquisition module 61 specifically includes: determining a serving beam of the UE among the beams and a usage manner of another beam according to the first beam combination usage result indicated by the beam precoding manner; and allocating a time-frequency resource to the serving beam, transmitting data to the UE on the time-frequency resource by using the serving beam, and transmitting data according to the usage manner of the another beam by using the another beam.

Further, optionally, the transmitting, by the scheduling module 62, data according to the usage manner of the another beam by using the another beam specifically includes: when the usage manner of the another beam is: the another beam cannot be used to transmit data to another UE on the time-frequency resource used by the serving beam, forbidding use of the another beam to transmit data to another UE on the time-frequency resource used by the serving beam; and when the usage manner of the another beam is: the another beam needs to be used to transmit data to another UE on the time-frequency resource used by the serving beam, transmitting, by using the another beam, data to another UE on the time-frequency resource used by the serving beam.

In an optional implementation manner, the scheduling module 62 is further configured to: when the beam combination usage manner includes the beam cooperation, before transmitting data to the UE on the allocated time-frequency resource by using the serving beam, determine a working phase of each serving beam according to the beam precoding manner used by the UE, and if the serving beam does not work at the determined phase, adjust a phase of the serving beam, so that the serving beam works at the determined phase. Based on this, the scheduling module 62 being configured to transmit data to the UE on the allocated time-frequency resource by using the serving beam includes: the scheduling module 62 being specifically configured to transmit data to the UE on the time-frequency resource by using the serving beam whose phase is already adjusted.

Further, optionally, the determining, by the scheduling module 62, a working phase of each serving beam according to the beam precoding manner used by the UE specifically includes: determining a received-signal phase of a reference serving beam and a difference between the received-signal phase of the reference serving beam and a received-signal phase of another serving beam according to the beam precoding manner used by the UE; and using the received-signal phase of the reference serving beam as a working phase of the reference serving beam, and adding the received-signal phase of the reference serving beam to the difference between the received-signal phase of the reference serving beam and the received-signal phase of the another serving beam, to obtain a working phase of the another serving beam.

The functional modules of the base station provided in this embodiment may be configured to execute the procedures of the method embodiment shown in FIG. 3, and the specific working principle thereof is not described repeatedly herein. For details, reference may be made to the description of the method embodiment.

The base station provided in this embodiment cooperates with the UE provided in the foregoing embodiment, acquires a beam precoding manner used by the UE when scheduling the UE, and schedules the UE based on the beam precoding manner. A beam combination usage manner used in a process of determining the beam precoding manner is not limited to beam multiplexing, but includes beam selection, beam multiplexing, and beam cooperation. Therefore, a beam combination usage manner can be selected flexibly according to inter-beam interference. Therefore, when the base station in this embodiment schedules the UE based on the precoding manner, a manner for using beams in combination is based on full consideration of inter-beam interference, which helps increase a system throughput.

Figure 7:
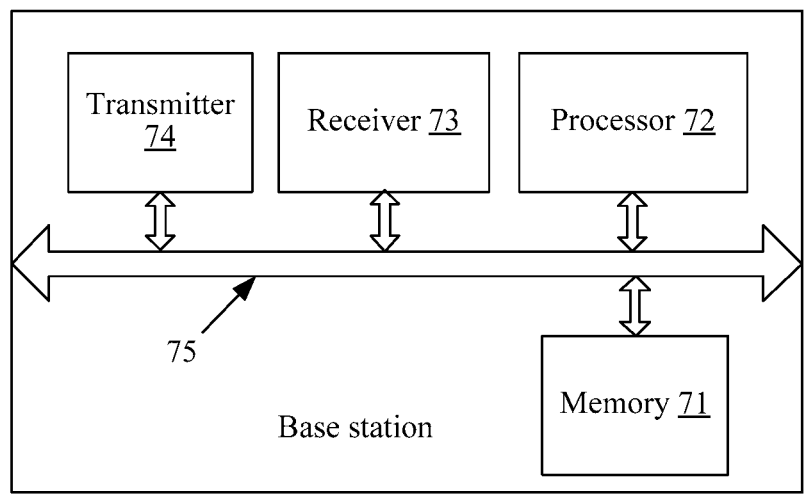
FIG. 7 is a schematic structural diagram of another base station according to an embodiment of the present disclosure.

FIG. 7 is a schematic structural diagram of another base station according to an embodiment of the present disclosure. As shown in FIG. 7, the base station includes: a processor 72.

The processor 72 is configured to acquire a beam precoding manner used by UE, and schedule the UE according to the beam precoding manner, where the beam precoding manner is used to indicate a first beam combination usage result, and the first beam combination usage result includes usage manners, which are determined by the UE when the UE uses beams in combination, of the beams.

If a total quantity of the beams is 2, a beam combination usage manner includes one of beam selection, beam multiplexing, and beam cooperation; if the total quantity of the beams is 3, the beam combination usage manner includes one or two of the beam selection, the beam multiplexing, and the beam cooperation; and if the total quantity of the beams is greater than or equal to 4, the beam combination usage manner includes at least one of the beam selection, the beam multiplexing, and the beam cooperation.

In this embodiment, the beam selection refers to: it is required that at least one beam among the beams that is different from a serving beam cannot serve another UE on a time-frequency resource used by the serving beam;

the beam multiplexing refers to: it is required that at least one beam among the beams that is different from a serving beam serves another UE on a time-frequency resource used by the serving beam; and the beam cooperation refers to: it is required that at least two beams that use a same time-frequency resource among the beams are used as serving beams, where the serving beam refers to a beam that serves the UE in this embodiment among the beams.

Further, as shown in FIG. 7, the base station may further include a memory 71.

The memory 71 may include a read-only memory and a random access memory, and provide an instruction and data for the processor 72. A part of the memory 71 may further include a nonvolatile random access memory (NVRAM).

The memory 71 stores the following elements that can execute a module or a data structure, or a subset of the elements, or an extended set of the elements:

an operation instruction: including various operation instructions, used to implement various operations; and an operating system: including various system programs, used to implement various basic services and process hardware-based tasks.

In this embodiment of the present disclosure, the processor 72 executes a corresponding operation by invoking the operation instruction (the operation instruction may be stored in the operating system) stored in the memory 71.

Optionally, the processor 72 can control operations of the base station in this embodiment. The processor 72 may also be referred to as a CPU. The memory 71 may include a read-only memory and a random access memory, and provide an instruction and data for the processor 72. A part of the memory 71 may further include a nonvolatile random access memory (NVRAM). In a specific application, components of the base station in this embodiment may be coupled together by using a bus system 75, where besides a data bus, the bus system 75 may further include a power supply bus, a control bus, state signal bus, and the like. However, for clear description, all buses are marked as the bus system 75 in the figure.

The method disclosed in the foregoing embodiment of the present disclosure may be applied in the processor 72, or may be implemented by the processor 72. The processor 72 may be an integrated circuit chip having a signal processing capability. In an implementation process, each step of the method may be completed by using an integrated hardware logic circuit in the processor 72 or instructions in a software form. The processor 72 may be a general purpose processor, a digital signal processor (DSP), an application specific integrated circuit (ASIC), a field programmable gate array (FPGA), or other programmable logic devices, discrete gate or transistor logic devices, and discrete hardware components. The general purpose processor may be a microprocessor or the processor may also be any conventional processor or the like. The steps disclosed with reference to the method in the embodiments of the present disclosure may be directly executed and completed by a hardware decoding processor or may be executed and completed by a combination of hardware and software modules in the decoding processor. The software module may be located in a mature storage medium in the art, such as a random access memory, a flash memory, a read-only memory, a programmable read-only memory, an electronically erasable programmable memory, or a register. The storage medium is located in the memory 71, and the processor 72 reads information in the memory 71, and completes the steps of the method in combination with the hardware thereof.

In an optional implementation manner, as shown in FIG. 7, the base station further includes a receiver 73.

The receiver 73 may be configured to receive an index value that corresponds to the beam precoding manner and that is sent by the UE. Based on this, the acquiring, by the processor 72, a beam precoding manner used by UE specifically includes: performing matching in a preset beam precoding table according to the index value that corresponds to the beam precoding manner and that is received by the receiver 73, and determining a beam combination usage result that matches the index value corresponding to the beam precoding manner, where a correspondence between various beam combination usage results and index values is stored in the beam precoding table.

In an optional implementation manner, as shown in FIG. 7, the base station further includes a transmitter 74.

The scheduling, by the processor 72, the UE according to the beam precoding manner specifically includes: determining a serving beam of the UE among the beams and a usage manner of another beam according to the first beam combination usage result indicated by the beam precoding manner; and allocating a time-frequency resource to the serving beam, controlling the transmitter 74 to transmit, by using the serving beam, data to the UE on the time-frequency resource, and controlling the transmitter 74 to transmit, by using the another beam, data according to the usage manner of the another beam; and correspondingly, the transmitter 74 may be configured to transmit, under the control of the processor 72, data to the UE on the time-frequency resource by using the serving beam, and transmit data according to the usage manner of the another beam by using the another beam.

Further, optionally, the controlling, by the processor 72, the transmitter 74 to transmit, by using the another beam, data according to the usage manner of the another beam specifically includes: when the usage manner of the another beam is: the another beam cannot be used to transmit data to another UE on the time-frequency resource used by the serving beam, forbidding the transmitter 74 to transmit, by using the another beam, data to another UE on the time-frequency resource used by the serving beam; and when the usage manner of the another beam is: the another beam needs to be used to transmit data to another UE on the time-frequency resource used by the serving beam, controlling the transmitter 74 to transmit, by using the another beam, data to another UE on the time-frequency resource used by the serving beam.

Correspondingly, the transmitting, by the transmitter 74 under the control of the processor 72, data according to the usage manner of the another beam by using the another beam specifically includes: when the usage manner of the another beam is: the another beam cannot be used to transmit data to another UE on the time-frequency resource used by the serving beam, not transmitting, by using the another beam, data to another UE on the time-frequency resource used by the serving beam; and when the usage manner of the another beam is: the another beam needs to be used to transmit data to another UE on the time-frequency resource used by the serving beam, transmitting, by using the another beam, data to another UE on the time-frequency resource used by the serving beam.

In an optional implementation manner, the processor 72 is further configured to: when the beam combination usage manner includes the beam cooperation, before controlling the transmitter 74 to transmit, by using the serving beam, data to the UE on the time-frequency resource, determine a working phase of each serving beam according to the beam precoding manner used by the UE, and if the serving beam does not work at the determined phase, adjust a phase of the serving beam, so that the serving beam works at the determined phase. Based on this, the controlling, by the processor 72, the transmitter 74 to transmit, by using the serving beam, data to the UE on the time-frequency resource specifically includes: controlling the transmitter 74 to transmit, by using the serving beam whose phase is already adjusted, data to the UE on the time-frequency resource.

Further, optionally, the determining, by the processor 72, a working phase of each serving beam according to the beam precoding manner used by the UE specifically includes: determining a received-signal phase of a reference serving beam and a difference between the received-signal phase of the reference serving beam and a received-signal phase of another serving beam according to the beam precoding manner used by the UE; and using the received-signal phase of the reference serving beam as a working phase of the reference serving beam, and adding the received-signal phase of the reference serving beam to the difference between the received-signal phase of the reference serving beam and the received-signal phase of the another serving beam, to obtain a working phase of the another serving beam.

The base station provided in this embodiment may be configured to execute the procedures of the method embodiment shown in FIG. 3, and the specific working principle thereof is not described repeatedly herein. For details, reference may be made to the description of the method embodiment.

The base station provided in this embodiment cooperates with the UE provided in the foregoing embodiment, acquires a beam precoding manner used by the UE when scheduling the UE, and schedules the UE based on the beam precoding manner. A beam combination usage manner used in a process of determining the beam precoding manner is not limited to beam multiplexing, but includes beam selection, beam multiplexing, and beam cooperation. Therefore, a beam combination usage manner can be selected flexibly according to inter-beam interference. Therefore, when the base station in this embodiment schedules the UE based on the precoding manner, a manner for using beams in combination is based on full consideration of inter-beam interference, which helps increase a system throughput.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features of the technical solutions, without departing from the scope of the technical solutions of the embodiments of the present disclosure.

What is claimed is:

1. A beam precoding manner reporting method, comprising:

determining, by a user equipment (UE), a beam precoding manner used by the UE, wherein the beam precoding manner indicates a first beam combination usage result, and the first beam combination usage result comprises usage manners of a plurality of beams that are determined by the UE when the UE uses beams in combination, wherein: if a total quantity of the plurality of beams is 2, a beam combination usage manner comprises one of beam selection, beam multiplexing, and beam cooperation; if the total quantity of the plurality of beams is 3, the beam combination usage manner comprises one or two of the beam selection, the beam multiplexing, and the beam cooperation; and, if the total quantity of the plurality of beams is greater than or equal to 4, the beam combination usage manner comprises at least one of the beam selection, the beam multiplexing, and the beam cooperation, wherein the determining, by the UE, the beam precoding manner used by the UE comprises:

determining, by the UE according to received-signal strengths of the plurality of beams, a beam whose received-signal strength is a greatest among the beams in the plurality of beams as a first serving beam, separately comparing differences between the received-signal strength of the first serving beam and received-signal strengths of other beams in the plurality of beams with a first threshold and a second threshold, and determining usage manners of the other beams according to a comparison result, to obtain the first beam combination usage result, wherein the first threshold is greater than the second threshold; and sending, by the UE, the beam precoding manner to a base station, so that the base station schedules the UE based on the beam precoding manner, wherein beam selection refers to requiring, for a serving beam, that at least one beam among the beams in the plurality of beams that is different from the serving beam cannot serve another UE on a time-frequency resource used by the serving beam;

wherein beam multiplexing refers to requiring, for a serving beam, that at least one beam among the plurality of beams that is different from the serving beam serves another UE on a time-frequency resource used by the serving beam;

wherein beam cooperation refers to requiring that at least two beams of the plurality of beams that use a same time-frequency resource among the plurality of beams are used as serving beams of the UE; and wherein serving beam refers to a beam that serves the UE among the plurality of beams.

2. The method according to claim 1, wherein the separately comparing, by the UE, differences between the received-signal strength of the first serving beam and received-signal strengths of the other beams with the first threshold and the second threshold, and determining usage manners of the other beams according to the comparison result comprises:
  separately comparing, by the UE, a first difference with the first threshold and the second threshold, wherein the first difference is a difference between the received-signal strength of the first serving beam and a received-signal strength of a second beam among the other beams;
  if the first difference is greater than the first threshold, determining that the second beam can serve another UE on a time-frequency resource used by the first serving beam;
  if the first difference is less than the second threshold, determining that the second beam serves the UE as a second serving beam; and
  if the first difference is greater than the second threshold and less than the first threshold, determining that the second beam cannot serve another UE on the time-frequency resource used by the first serving beam.

3. The method according to claim 1, wherein if the beam combination usage manner comprises the beam cooperation, the method further comprises:
  specifying, by the UE, a working phase of each serving beam according to received-signal phases of the at least two serving beams, and indicating the working phase of each serving beam by using the beam precoding manner.

4. The method according to claim 3, wherein the specifying the working phase of each serving beam according to received-signal phases of the at least two serving beams, and indicating the working phase of each serving beam by using the beam precoding manner comprises:
  determining, by the UE, a serving beam among the at least two serving beams as a reference serving beam, and obtaining a difference between a received-signal phase of the reference serving beam and a received-signal phase of another serving beam; and
  indicating, by the UE, the received-signal phase of the reference serving beam and the difference between the received-signal phase of the reference serving beam and the received-signal phase of the another serving beam by using the beam precoding manner.

5. The method according to claim 1, wherein the sending, by the UE, the beam precoding manner to the base station comprises:
  performing, by the UE, matching in a beam precoding table according to the beam precoding manner, to acquire an index value corresponding to the beam precoding manner, wherein a correspondence between various beam combination usage results and index values is stored in the beam precoding table; and
  sending, by the UE, the index value corresponding to the beam precoding manner to the base station.

6. The method according to claim 1, wherein the sending, by the UE, the beam precoding manner to the base station comprises:
  sending, by the UE, the beam precoding manner to the base station after a rank indication (RI) subframe; or
  sending, by the UE, the beam precoding manner to the base station before an RI subframe.

7. A user equipment (UE), comprising:
  a power measurement circuit, configured to measure received-signal strengths of a plurality of beams;
  a processor, configured to determine a beam precoding manner used by the UE, wherein the beam precoding manner indicates a first beam combination usage result, and the first beam combination usage result comprises usage manners of the plurality of beams that are determined by the UE when the UE uses beams in combination, wherein: if a total quantity of the plurality of beams is 2, a beam combination usage manner comprises one of beam selection, beam multiplexing, and beam cooperation; if the total quantity of the plurality of beams is 3, the beam combination usage manner comprises one or two of the beam selection, the beam multiplexing, and the beam cooperation; and, if the total quantity of the plurality of beams is greater than or equal to 4, the beam combination usage manner comprises at least one of the beam selection, the beam multiplexing, and the beam cooperation, wherein the determining the beam precoding manner used by the UE comprises:
    determining, according to received-signal strengths of the beams in the plurality of beams, a beam whose received-signal strength is a greatest among the beams in the plurality of beams as a first serving beam,
    separately comparing differences between the received-signal strength of the first serving beam and received-signal strengths of other beams in the plurality of beams with a first threshold and a second threshold, and
    determining usage manners of the other beams according to a comparison result, to obtain the first beam combination usage result,
    wherein the first threshold is greater than the second threshold; and
  a transmitter, configured to send the beam precoding manner to a base station, so that the base station schedules the UE based on the beam precoding manner,
  wherein beam selection refers to requiring, for a serving beam, that at least one beam among the beams in the plurality of beams that is different from the serving beam cannot serve another UE on a time-frequency resource used by the serving beam;
  wherein beam multiplexing refers to requiring, for a serving beam, that at least one beam among the beams in the plurality of beams that is different from the serving beam serves another UE on a time-frequency resource used by the serving beam;
  wherein beam cooperation refers to requiring that at least two beams of the plurality of beams that use a same time-frequency resource among the plurality of beams are used as the serving beams of the UE; and
  wherein serving beam refers to a beam that serves the UE among the plurality of beams.

8. The UE according to claim 7, wherein the separately comparing differences between the received-signal strength of the first serving beam and received-signal strengths of the other beams with the first threshold and the second threshold, and determining usage manners of the other beams according to a comparison result comprises:
  separately comparing a first difference with the first threshold and the second threshold, wherein the first difference is a difference between the received-signal strength of the first serving beam and a received-signal strength of a second beam among the other beams;

if the first difference is greater than the first threshold, determining that the second beam can serve another UE on a time-frequency resource used by the first serving beam;

if the first difference is less than the second threshold, determining that the second beam serves the UE as a second serving beam; and if the first difference is greater than the second threshold and less than the first threshold, determining that the second beam cannot serve another UE on the time-frequency resource used by the first serving beam.

9. The UE according to claim 7, wherein the processor is further configured to:

when the beam combination usage manner comprises the beam cooperation, specify a working phase of each serving beam according to received-signal phases of the at least two serving beams, and indicate the working phase of each serving beam by using the beam precoding manner.

10. The UE according to claim 9, wherein the specifying the working phase of each serving beam according to received-signal phases of the at least two serving beams, and indicating the working phase of each serving beam by using the beam precoding manner comprises:

determining a serving beam among the at least two serving beams as a reference serving beam, and obtaining a difference between a received-signal phase of the reference serving beam and a received-signal phase of another serving beam; and indicating the received-signal phase of the reference serving beam and the difference between the received-signal phase of the reference serving beam and the received-signal phase of the another serving beam by using the beam precoding manner.

11. The UE according to claim 7, wherein the processor is further configured to perform matching in a beam precoding table according to the beam precoding manner, to acquire an index value corresponding to the beam precoding manner; and wherein the sending the beam precoding manner to the base station comprises: sending the index value corresponding to the beam precoding manner to the base station, wherein a correspondence between various beam combination usage results and index values is stored in the beam precoding table.

12. The UE according to claim 7, wherein the sending the beam precoding manner to a base station specifically comprises:

sending the beam precoding manner to the base station after a rank indication (RI) subframe; or sending the beam precoding manner to the base station before an RI subframe.

13. A base station, comprising:

a processor, configured to acquire a beam precoding manner used by user equipment (UE), and schedule the UE according to the beam precoding manner, wherein the beam precoding manner indicates a first beam combination usage result, and the first beam combination usage result comprises usage manners of a plurality of beams that are determined by the UE when the UE uses beams in combination, wherein: if a total quantity of the plurality of beams is 2, a beam combination usage manner comprises one of beam selection, beam multiplexing, and beam cooperation; if the total quantity of the plurality of beams is 3, the beam combination usage manner comprises one or two of the beam selection, the beam multiplexing, and the beam cooperation; and, if the total quantity of the plurality of beams is greater than or equal to 4, the beam combination usage manner comprises at least one of the beam selection, the beam multiplexing, and the beam cooperation, wherein the beam precoding manner is determined based on:

determining, according to received-signal strengths of the plurality of beams, a beam whose received-signal strength is a greatest among the beams in the plurality of beams as a first serving beam, separately comparing differences between the received-signal strength of the first serving beam and received-signal strengths of other beams in the plurality of beams with a first threshold and a second threshold, and determining usage manners of the other beams according to a comparison result, to obtain the first beam combination usage result, wherein the first threshold is greater than the second threshold;

wherein beam selection refers to requiring, for a serving beam, that at least one beam among the beams in the plurality of beams that is different from the serving beam cannot serve another UE on a time-frequency resource used by the serving beam;

wherein beam multiplexing refers to requiring, for a serving beam, that at least one beam among the beams in the plurality of beams that is different from the serving beam serves another UE on a time-frequency resource used by the serving beam;

wherein beam cooperation refers to requiring that at least two beams of the plurality of beams that use a same time-frequency resource among the plurality of beams are used as serving beams of the UE; and wherein serving beam refers to a beam that serves the UE among the plurality of beams.

14. The base station according to claim 13, wherein the base station further comprises:

a receiver, configured to receive an index value that corresponds to the beam precoding manner and that is sent by the UE;

wherein acquiring the beam precoding manner used by the UE comprises:

performing matching in a beam precoding table according to the index value that corresponds to the beam precoding manner and that is received by the receiver, and determining a beam combination usage result that matches the index value corresponding to the beam precoding manner, wherein a correspondence between various beam combination usage results and index values is stored in the beam precoding table.

15. The base station according to claim 13, wherein the base station further comprises a transmitter;

wherein scheduling the UE according to the beam precoding manner comprises:

determining a serving beam of the UE among the plurality of beams and a usage manner of another beam of the plurality of beams according to the first beam combination usage result indicated by the beam precoding manner; and allocating a time-frequency resource to the serving beam, controlling the transmitter to transmit, by using the serving beam, data to the UE on the time-frequency resource, and controlling the transmitter to transmit, by using the another beam, data according to the usage manner of the another beam; and wherein the transmitter is configured to transmit, under the control of the processor, data to the UE on the time-frequency resource by using the serving beam, and transmit data according to the usage manner of the another beam by using the another beam.

16. The base station according to claim 15, wherein the controlling the transmitter to transmit, by using the another beam, data according to the usage manner of the another beam comprises:
when the usage manner of the another beam is: the another beam cannot be used to transmit data to another UE on the time-frequency resource used by the serving beam, forbidding the transmitter to transmit, by using the another beam, data to the another UE on the time-frequency resource used by the serving beam; and
when the usage manner of the another beam is: the another beam needs to be used to transmit data to another UE on the time-frequency resource used by the serving beam, controlling the transmitter to transmit, by using the another beam, data to the another UE on the time-frequency resource used by the serving beam.

17. The base station according to claim 15, wherein the processor is further configured to: when the beam combination usage manner comprises the beam cooperation, before controlling the transmitter to transmit, by using the serving beam, data to the UE on the time-frequency resource, determine a working phase of each serving beam according to the beam precoding manner, and if the serving beam does not work at the determined phase, adjust a phase of the serving beam, so that the serving beam works at the determined phase.

18. The base station according to claim 17, wherein the determining the working phase of each serving beam according to the beam precoding manner comprises:
determining a received-signal phase of a reference serving beam and a difference between the received-signal phase of the reference serving beam and a received-signal phase of another serving beam according to the beam precoding manner; and
using the received-signal phase of the reference serving beam as a working phase of the reference serving beam, and adding the received-signal phase of the reference serving beam to the difference between the received-signal phase of the reference serving beam and the received-signal phase of the another serving beam, to obtain a working phase of the another serving beam.

* * * * *